(12) United States Patent
Liu et al.

(10) Patent No.: US 11,842,267 B2
(45) Date of Patent: Dec. 12, 2023

(54) COMPUTER-IMPLEMENTED METHOD USING A NEURAL NETWORK COMPRISING DOWN-SAMPLING SEGMENT, DENSELY CONNECTED SEGMENT, AND UP-SAMPLING SEGMENT, APPARATUS, AND COMPUTER-PROGRAM PRODUCT

(71) Applicant: BOE Technology Group Co., Ltd., Beijing (CN)

(72) Inventors: Hanwen Liu, Beijing (CN); Pablo Navarrete Michelini, Beijing (CN); Lijie Zhang, Beijing (CN); Dan Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 995 days.

(21) Appl. No.: 16/492,873

(22) PCT Filed: Mar. 22, 2019

(86) PCT No.: PCT/CN2019/079242
§ 371 (c)(1),
(2) Date: Sep. 10, 2019

(87) PCT Pub. No.: WO2020/062809
PCT Pub. Date: Apr. 2, 2020

(65) Prior Publication Data
US 2021/0326691 A1  Oct. 21, 2021

(30) Foreign Application Priority Data

Sep. 26, 2018 (CN) .......................... 201811123875.5

(51) Int. Cl.
*G06N 3/08* (2023.01)
*G06T 3/40* (2006.01)
(Continued)

(52) U.S. Cl.
CPC ............. *G06N 3/08* (2013.01); *G06F 18/211* (2023.01); *G06F 18/213* (2023.01); *G06T 3/4007* (2013.01); *G06T 3/4046* (2013.01)

(58) Field of Classification Search
None
See application file for complete search history.

(56) References Cited

U.S. PATENT DOCUMENTS 10,304,193 B1 * 5/2019 Wang .................... G06N 3/0454
11,308,361 B1 * 4/2022 Aitken ................... G06V 10/82
(Continued)

FOREIGN PATENT DOCUMENTS

CN     106651766 A    5/2017
CN     106910192 A    6/2017
(Continued)

OTHER PUBLICATIONS

L. Gatys et al., "Image Style Transfer Using Convolutional Neural Networks", 2016 IEEE CVPR, pp. 2414-2423.
(Continued)

*Primary Examiner* — Aaron M Richer
(74) *Attorney, Agent, or Firm* — Intellectual Valley Law, P.C.

(57) ABSTRACT

A computer-implemented method using a convolutional neural network is provided. The computer-implemented method using a convolutional neural network includes processing an input image through at least one channel of the convolutional neural network to generate an output image including content features of the input image morphed with style features of a reference style image. The at least one channel includes a down-sampling segment, a densely connected segment, and an up-sampling segment sequentially connected together. Processing the input image through the at least one channel of the convolutional neural network (Continued)

includes processing an input signal through the down-sampling segment to generate a down-sampling segment output; processing the down-sampling segment output through the densely connected segment to generate a densely connected segment output; and processing the densely connected segment output through the up-sampling segment to generate an up-sampling segment output. The input signal includes a component of the input image.

19 Claims, 5 Drawing Sheets

(51) Int. Cl.
*G06F 18/211* (2023.01)
*G06F 18/213* (2023.01)

(56) References Cited

U.S. PATENT DOCUMENTS

| | | | |
|---|---|---|---|
| 2017/0256033 | A1 | 9/2017 | Tuzel et al. |
| 2018/0096457 | A1* | 4/2018 | Savvides ............... G06F 16/50 |
| 2018/0197037 | A1 | 7/2018 | Navarrete Michelini et al. |
| 2018/0231871 | A1* | 8/2018 | Wang ..................... G06K 9/62 |
| 2019/0045168 | A1* | 2/2019 | Chaudhuri ............... G06T 7/55 |
| 2019/0138838 | A1 | 5/2019 | Liu et al. |
| 2019/0139191 | A1 | 5/2019 | Liu et al. |
| 2019/0180143 | A1* | 6/2019 | Lyu ........................ G06T 1/20 |
| 2019/0220746 | A1 | 7/2019 | Liu et al. |
| 2020/0082249 | A1* | 3/2020 | Hua ..................... G06T 11/001 |
| 2021/0150767 | A1* | 5/2021 | Ikai ........................ G06T 9/002 |
| 2021/0209459 | A1* | 7/2021 | Navarrete Michelini ................... G06N 3/0472 |
| 2021/0374478 | A1* | 12/2021 | Lin ....................... G06K 9/6261 |

FOREIGN PATENT DOCUMENTS

| | | | | |
|---|---|---|---|---|
| CN | 106991646 | A | | 7/2017 |
| CN | 107122826 | A * | 9/2017 | ........... G06K 9/6232 |
| CN | 107730474 | A | | 2/2018 |
| CN | 107767343 | A | | 3/2018 |
| CN | 107767408 | A | | 3/2018 |
| CN | 107862287 | A | | 3/2018 |
| CN | 107958246 | A | | 4/2018 |
| EP | 3617947 | A1 * | 3/2020 | ........... G06K 9/4628 |
| WO | 2018042388 | A1 | | 3/2018 |
| WO | 2019042139 | A1 | | 3/2019 |

OTHER PUBLICATIONS

X. Wang et al., "ESRGAN: Enhanced Super-Resolution Generative Adversarial Networks", arXiv:1809:00219v2 [cs.CV] Sep. 17, 2018.
International Search Report & Written Opinion dated Jun. 24, 2019, regarding PCT/CN2019/079242.
J. Johnson et al., "Perceptual Losses for Real-Time Style Transfer and Super-Resolution", arXiv: 1603:08155v1 [cs.CV] Mar. 27, 2016.
Prisma (app), Wikipedia, https://en.wikipedia.org/wiki/Prisma_(app).
The Extended European Search Report in the European Patent Application No. 19850717.0, dated Jul. 29, 2022.
Liu Hanwen et al., "Artsy-Gan: A Style transfer system with improved quality, diversity and performance", 2018 24th International Conference on Pattern Recognition (ICPR), IEEE, Aug. 20, 2018, pp. 79-84, XP033459873, DOI:10.1109/ICPR.2018.8546172.
Johnson Justin et al., "Perceptual Losses for Real-Time Style Transfer and Super-Resolution", Sep. 17, 2016, SAT 2015 18th International Conference, Austin, TX, USA, Sep. 24-27, 2015, pp. 694-711, XP047356366, ISBN: 978-3-540-74549-5.
Huang Gao et al., "Densely Connected Convolutional Networks", 2017 IEEE Conference on Computer Vision and Pattern Recognition (CVPR), IEEE Computer Society, US, Jul. 21, 2017, pp. 2261-2269, XP033249569, ISSN: 1063-6919, DOI:10.1109/CVPR.2017.243.
Zhang Lvmin et al., "Style Transfer for Anime Sketches with Enhanced Residual U-net and Auxiliary Classifier GAN", 2017 4th IAPR Asian Conference on Pattern Recognition (ACPR), Nov. 1, 2017, pp. 506-511, XP055943600, DOI: 10-1109/ACPR.2017.61, ISBN: 978-1-5386-3354-0.
Yongcheng Jing et al., "Neural Style Transfer: A Review", ARXIV. org, Cornell University Library, 201 Olin Library Cornell University Ithaca, NY 14853, May 11, 2017, XP081419090.

\* cited by examiner

COMPUTER-IMPLEMENTED METHOD USING A NEURAL NETWORK COMPRISING DOWN-SAMPLING SEGMENT, DENSELY CONNECTED SEGMENT, AND UP-SAMPLING SEGMENT, APPARATUS, AND COMPUTER-PROGRAM PRODUCT

CROSS-REFERENCE TO RELATED APPLICATION

This application claims priority to Chinese Patent Application No. 201811123875.5, filed Sep. 26, 2018, the contents of which are incorporated by reference in the entirety.

TECHNICAL FIELD

The present invention relates to display technology, more particularly, to a computer-implemented method, an apparatus, and a computer-program product.

BACKGROUND

To process an image, content features of the image sometimes may be morphed with style features of a reference style image. For example, the content of the image is kept (e.g. the scenery, the objects, or the people in the image are kept.), but the style of the image is changed. Different styles include styles of arts, styles of artists, styles of art genres. For example, different styles include, but are not limited to, sketch style, ukiyo-e style, and Van Gogh style.

SUMMARY

In one aspect, the present invention provides a computer-implemented method using a convolutional neural network, comprising processing an input image through at least one channel of the convolutional neural network to generate an output image comprising content features of the input image morphed with style features of a reference style image, wherein the at least one channel comprises a down-sampling segment, a densely connected segment, and an up-sampling segment sequentially connected together; wherein processing the input image through the at least one channel of the convolutional neural network comprises processing an input signal through the down-sampling segment to generate a down-sampling segment output; processing the down-sampling segment output through the densely connected segment to generate a densely connected segment output; and processing the densely connected segment output through the up-sampling segment to generate an up-sampling segment output; wherein the input signal comprises a component of the input image.

Optionally, processing the input signal through the down-sampling segment comprises processing the input signal through at least one down-sampling unit and at least one convolutional layer in the down-sampling segment; down-sampling units and convolutional layers in the down-sampling segment are alternately arranged; and a respective down-sampling unit is configured to convert an input into an output having a different scale.

Optionally, processing the densely connected segment output through the up-sampling segment comprises processing the densely connected segment output through at least one up-sampling unit and at least one convolutional layer in the up-sampling segment; up-sampling units and convolutional layers in the up-sampling segment are alternately arranged; a respective up-sampling unit is configured to convert an input into an output having a different scale; a total number of down-sampling units in the down-sampling segment is the same as a total number of up-sampling units in the up-sampling segment in a same channel; and the down-sampling units in the down-sampling segment respectively correspond to the up-sampling units in the up-sampling segment in the same channel.

Optionally, processing the down-sampling segment output through the densely connected segment comprises processing the down-sampling segment output through at least one densely connected convolutional network module; a respective densely connected convolutional network module in the densely connected segment comprises a plurality of convolutional blocks sequentially connected, a respective one of the plurality of convolutional blocks comprising at least one convolutional layer; an input to the respective one of the plurality of convolutional blocks in the respective densely connected convolutional network module comprises outputs respectively from any previous convolutional blocks of the plurality of convolutional blocks in the respective densely connected convolutional network module; and an output from the respective densely connected convolutional network module comprises outputs respectively from the plurality of convolutional blocks in the respective densely connected convolutional network module; wherein the input of the outputs respectively from the any previous convolutional blocks to the respective one of the plurality of convolutional blocks is performed by concatenation.

Optionally, the respective one of the plurality of convolutional blocks comprises a first convolutional layer comprising a 1*1 convolutional kernel and a second convolutional layer comprising a 3*3 convolutional kernel.

Optionally, the down-sampling segment further comprises at least one cross-scale concatenation; wherein processing the input signal through the down-sampling segment further comprises outputting an output from an upstream down-sampling unit to a respective cross-scale concatenation and to an upstream convolutional layer; further down-sampling the output from the upstream down-sampling unit by the respective cross-scale concatenation; and inputting a down-sampling output from the respective cross-scale concatenation to a downstream convolutional layer of the convolutional layers in the down-sampling segment; wherein the downstream convolutional layer and the upstream convolutional layer are of different scales.

Optionally, down-sampling the output from one of the down-sampling units by the at least one cross-scale concatenation in the down-sampling segment is a D-Bicubic sampling.

Optionally, the up-sampling segment further comprise at least one cross-scale concatenation; wherein processing the input signal through the up-sampling segment further comprises outputting an output from an upstream up-sampling unit to a respective cross-scale concatenation and to an upstream convolutional layer; further up-sampling the output from the upstream up-sampling unit by the respective cross-scale concatenation; and inputting an up-sampling output from the respective cross-scale concatenation to a downstream convolutional layer of the convolutional layers in the up-sampling segment; wherein the downstream convolutional layer and the upstream convolutional layer are of different scales.

Optionally, up-sampling the output from one of the up-sampling units by the at least one cross-scale concatenation in the up-sampling segment is a U-Bicubic sampling.

Optionally, the computer-implemented method further comprises inputting outputs from the convolutional layers in the down-sampling units to the convolutional layers in the up-sampling units by at least one cross-segmental concatenation; wherein an output from a respective convolutional layer in the down-sampling units is inputted to a respective convolutional layer of a same scale in the up-sampling units.

Optionally, processing the input image through at least one channel of the convolutional neural network comprises processing a Y component of the input image through a Y channel of the convolutional neural network; processing a U component of the input image through a U channel of the convolutional neural network; and processing a V component of the input image through a V channel of the convolutional neural network; wherein the Y component, the U component, and the V component are components of the input image in a YUV space.

Optionally, the YUV space is a YUV420 space or a YUV422 space.

Optionally, down-sampling segments and up-sampling segments of the Y component, the U component, and the V component comprise convolutional layers of a plurality of different scales, a convolutional layer of a greatest scale is present in a down-sampling segment and an up-sampling segment of the Y component and is absent in down-sampling segments and up-sampling segments of the U component and the V component; a convolutional layer of a second greatest scale in the down-sampling segments of the U component and the V component is preceded by a down-sampling unit but not by any convolutional layer; and a convolutional layer of a second greatest scale in the up-sampling segments of the U component and the V component is succeeded by an up-sampling unit but not by any convolutional layer.

Optionally, the computer-implemented method further comprise converting outputs from the Y channel, the U channel, and the V channel into the output image in an RGB space.

Optionally, the computer-implemented method further comprises pre-training the convolutional neural network by selecting a training style image; extracting style features of the training style image; selecting a training content image from a collection of training images; excluding the training content image from the collection of training images; extracting content features of the training content image; processing the training content image through the at least one channel of the convolutional neural network to generate a training output image comprising the content features of the training content image morphed with the style features of the training style image; extracting content features and style features of the training output image; computing loss by comparing the content features of the training output image with the content features of the training content image and comparing the style features of the training output image with the style features of the training style image using a loss function; and tuning the convolutional neural network based on the loss.

Optionally, the computer-implemented method further comprises reiterating pre-training the convolutional neural network using a different training content image or a different training style image.

Optionally, the loss comprises a L1 loss, a content loss, and a style loss; the L1 loss is calculated by $$L_{L1} = \frac{W}{B+\varepsilon};$$

wherein $\varepsilon$ is a positive number;

$$W = \frac{\Sigma|w|}{C_w},$$

W is an average of absolute values of all convolutional kernels, $C_w$ stands for a total number of all convolutional kernels, w is a value of each of the convolutional kernels; and $$B = \frac{\Sigma|b|}{C_b},$$

B is an average of absolute values of all biases, $C_b$ stands for a total number of all biases, b is a value of each of the biases.

Optionally, extracting style features of the training style image, extracting content features of the training content image, and extracting content features and style features of the training output image are performed using an analysis network comprising a plurality of convolutional layers of different scales sequentially connected, and a plurality of down-sampling units respectively between adjacent convolutional layers of the plurality of convolutional layers of different scales, a respective down-sampling unit configured to convert an input into an output having a different scale.

In another aspect, the present invention provides an apparatus for generating a composite image comprising a memory; one or more processors; wherein the memory and the one or more processors are connected with each other; and the memory stores computer-executable instructions for controlling the one or more processors to process an input image through at least one channel of a convolutional neural network to generate an output image comprising content features of the input image morphed with style features of a reference style image, wherein the at least one channel comprises a down-sampling segment, a densely connected segment, and an up-sampling segment sequentially connected together; wherein the memory stores computer-executable instructions for controlling the one or more processors to process an input signal through the down-sampling segment to generate a down-sampling segment output; process the down-sampling segment output through the densely connected segment to generate a densely connected segment output; and process the densely connected segment output through the up-sampling segment to generate an up-sampling segment output.

In another aspect, the present invention provides a computer-program product comprising a non-transitory tangible computer-readable medium having computer-readable instructions thereon, the computer-readable instructions being executable by a processor to cause the processor to perform processing an input image through at least one channel of a convolutional neural network to generate an output image comprising content features of the input image morphed with style features of a reference style image, wherein the at least one channel comprises a down-sampling segment, a densely connected segment, and an up-sampling segment sequentially connected together; wherein processing the input image through the at least one channel of the convolutional neural network comprises processing an input signal through the down-sampling segment to generate a down-sampling segment output; processing the down-sampling segment output through the densely connected segment to generate a densely connected segment output; and processing the densely connected segment output through the up-sampling segment to generate an up-sampling segment output.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
FIG. 1 is a schematic diagram of an original input image of which a style haven't been morphed with a style of a reference style image in some embodiments according to the present disclosure.

As used herein, the term "convolutional kernel" refers to a two-dimensional matrix used in a convolution process. Optionally, a respective one item of a plurality items in the two-dimensional matrix has a certain value.

As used herein, the term "convolution" refers to a process of processing an image. A convolutional kernel is used for a convolution. For, each pixel of an input image has a value, a convolution kernel starts at one pixel of the input image and moves over each pixel in an input image sequentially. At each position of the convolutional kernel, the convolutional kernel overlaps a few pixels on the image based on the size of the convolution kernel. At a position of the convolutional kernel, a value of one of the few overlapped pixels is multiplied by a respective one value of the convolutional kernel to obtain a multiplied value of one of the few overlapped pixels. subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution may extract different features of the input image using different convolution kernels. In another example, a convolution process may add more features to the input image using different convolution kernels.

As used herein, the term "convolutional layer" refers to a layer in a convolutional neural network. The convolutional layer is used to perform convolution on an input image to obtain an output image. Optionally, different convolution kernels are used to performed different convolutions on the same input image. Optionally, different convolution kernels are used to performed convolutions on different parts of the same input image. Optionally, different convolution kernels are used to perform convolutions on different input images, for example, multiple images are inputted in a convolutional layer, a respective convolutional kernel is used to perform a convolution on an image of the multiple images. Optionally, different convolution kernels are used according to different situations of the input image.

As used herein, the term "active layer" refers to a layer in a convolutional neural network. An active layer can perform a non-linear mapping on an output signal output from a convolutional layer. Optionally, a convolutional layer includes an activation layer. Various functions may be used in an activation layer. Examples of functions suitable for being adopted in an activation layer include, but are not limited to REL, and sigmoid.

As used herein, the term "normalization layer" refers to a layer in a convolutional neural network. A normalization layer is used to normalize an output signal output from a convolutional layer. Optionally, a convolutional layer includes a normalization layer. Various appropriate functions may be adopted by a normalization layer. Examples of functions suitable to be used in a normalization layer include, but are not limited to, instance normalization. Optionally, the instance normalization normalizes a signal based on a mean and a variance of the signal. For example, a size of a mini-batch is T, and a number of images output from a convolutional layer is C. The images output from the convolutional layer are matrix having H rows and W columns. A shape of a set of the images output from the convolutional layer is (T, C, W, H). The normalization formula of instance normalization is as follows:

$$y_{tijk} = \frac{x_{tijk} - \mu_{ti}}{\sqrt{\sigma_{ti}^2 + \varepsilon}}, \mu_{ti} = \frac{1}{HW}\sum_{l=1}^{W}\sum_{m=1}^{H}x_{tilm},$$

$$\sigma_{ti}^2 = \frac{1}{HW}\sum_{l=1}^{W}\sum_{m=1}^{H}(x_{tilm} - m\mu_{ti})^2;$$

Wherein $x_{tijk}$ is a value of an image in the set of images output from the convolutional layer, the image is the i-th image in k-th row and j-th column of a t-th patch of the set of images output from the convolutional layer. $y_{tijk}$ represents a result obtained by inputting $x_{tijk}$ into the formula of instance normalization. $\varepsilon$ is a very small positive number for preventing the denominator from being zero.

As used herein, the term "down-sampling" refers to a process of extracting features of an input image, and outputting an output image with a smaller scale.

As used herein, the term "pooling" refers to a type of down-sampling. Various methods may be used for pooling. Examples of methods suitable for pooling includes, but are not limited to, max-pooling, avg-polling, decimation, and demuxout.

As used herein, the term "up-sampling" refers to a process of adding more information to an input image, and outputting an outputting image with a larger scale.

Figure 4:
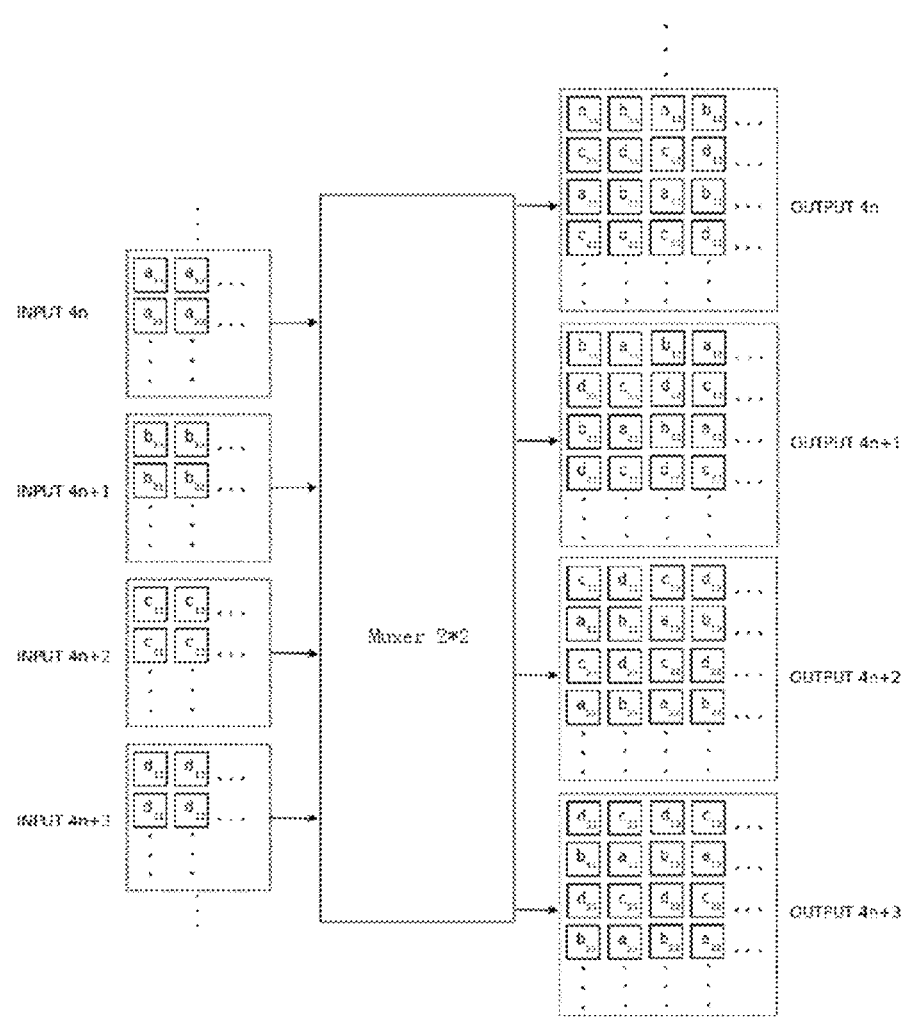
FIG. 4 is a schematic diagram illustrating a working principle of Muxer layer in some embodiments according to the present disclosure.

As used herein, the term "Muxer layer" refers to a layer in a convolutional neural network. A Muxer layer performs a type of up-sampling. In one example, a plurality of input images are input in the Muxer layer. The Muxer layer rearranges the plurality of input images, and outputs a plurality of output images. The number of the plurality of input images is equivalent to the number of plurality of output images. A size of a respective one of the plurality of output images is larger than a size of one of the plurality of input images. In another example, referring to FIG. 4 which is a schematic diagram illustrating a working principle of Muxer layer in some embodiments according to the present disclosure, a 2*2 Muxer layer outputs a plurality of output images having sizes four times larger than sizes of the plurality of input images. For example, four input images having 2*2 size are input in the 2*2 Muxer layer, all the pixels of the four input images are combined and rearranged into four images having 4*4 size, and the four output images having 4*4 size are output from the 2*2 Muxer layer. Examples of Muxer layer include, but are not limited to, the Muxer layer discussed in Chinese Patent Publication Nos. CN107124609A and CN107122826A, and U.S. Patent Publication No. US2018315165A1; the contents of which are incorporated herein by reference in entirety.

As used herein, the term "bicubic sampling", also known as "bicubic interpolation sampling", refers to a type of sampling. Based on different situation, optionally, a bicubic sampling may be a bicubic down-sampling (D-Bicubic), optionally, a bicubic sampling may be a bicubic up-sampling (U-Bicubic). In one example, the bicubic down-sampling (D-Bicubic) adopts bicubic interpolation during down-sampling. In another example, the bicubic up-sampling (U-Bicubic) adopts bicubic interpolation during up-sampling.

As used herein, the term "neural network" refers to a network used for solving artificial intelligence (AI) problems. A neural network includes a plurality of hidden layers. A respective one of the plurality of hidden layers includes a plurality of neurons (e.g. nodes). A plurality of neurons in a respective one of the plurality of hidden layers are connected with a plurality of neurons in an adjacent one of the plurality of hidden layers. Connects between neurons have different weights. The neural network has a structure mimics a structure of a biological neural network. The neural network can solve problems using a non-deterministic manner.

Parameters of the neural network can be tuned by pre-training, for example, a large amount of problems are input in the neural network, and results are obtained from the neural network. Feedbacks on these results are fed back into the neural network to allow the neural network to tune the parameters of the neural network. The pre-training allows the neural network to have a stronger problem-solving ability.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling layer can change a scale of an input image to one corresponding to a certain convolutional layer. The output from the up-sampling layer or the down-sampling layer can then be processed by a convolutional layer of a corresponding scale. This enables the convolutional layer to add or extract a feature having a scale different from that of the input image.

By pre-training, parameters include, but are not limited to, a convolutional kernel, a bias, and a weight of a convolutional layer of a convolutional neural network can be tuned. Accordingly, the convolutional neural network can be used in various applications such as image recognition, image feature extraction, and image feature addition.

As used herein, the term "RGB" refers to a color encoding system defining a color space. RGB model defines a color space in terms of a red component R, a green component G, and a blue component B. For example, in an RGB space, a respective one of a plurality of pixels described in an RGB space has a red component R, a green component G, and a blue component B.

As used herein, the term "YUV" refers to a color encoding system defining a color space. YUV model defines a color space in terms of a luminance component Y, a chrominance component U, and a chrominance component V. For example, in a YUV space, a respective one of a plurality of pixels has a luminance component Y, a chrominance component U, and a chrominance component V.

In some embodiments, YUV 422 and YUV 420 are two types of color encoding systems defining a color space. Using both YUV 422 and YUV 420 to represent a respective one of a plurality of pixels, the two component groups represent the respective one of the plurality of pixels both have a luminance component Y. However, using YUV 422, every two pixels shares a group of chrominance component U and chrominance component V. Using YUV 420, every four pixels shares a group of chrominance component U and chrominance component V.

For example, an original information of eight pixels in two rows is as follows:

[Y0 U0 V0] [Y1 U1 V1] [Y2 U2 V2] [Y3 U3 V3]
[Y4 U4 V4] [Y5 U5 V5] [Y6 U6 V6] [Y7 U7 V7]

Using YUV420, the information of the eight pixels in two rows is stored as follows:

Y0U0 Y1 Y2U2 Y3
Y4V4 Y5 Y6V6 Y7

Information of pixels mapped with the above information encoding by YUV 420 is as follows:

[Y0 U0 V4] [Y1 U0 V4] [Y2 U2 V6] [Y3 U2 V6]
[Y4 U0 V4] [Y5 U0 V4] [Y6 U2 V6] [Y7 U2 V6]

Comparing with the luminance component Y, human eyes have lower sensitive to the chrominance component U and the chrominance component V, which means the chrominance component U and the chrominance component V has less impact on the display performance. Therefore, sampling frequencies of the chrominance component U and the chrominance component V can be reduced to lower the data size of an image and lower the computation burden for processing the image.

As used herein, the term "conversion unit" refers to a unit used for converting YUV space into RGB space. For example, the conversion unit may convert a group of a luminance component Y, a chrominance component U, and a chrominance component V into a group of a red component R, a green component G, and a blue component B. Optionally, the conversion unit includes a merge unit. A formula for conversion in the merge unit is as follows:

$$\begin{bmatrix} R \\ G \\ B \end{bmatrix} = \begin{bmatrix} 1 & 0 & 1.13983 \\ 1 & -0.39465 & -0.58060 \\ 1 & 2.03211 & 0 \end{bmatrix} \begin{bmatrix} Y \\ U \\ V \end{bmatrix};$$

As used herein, the term "analysis network" refers to a deep neural network for extracting features. The analysis network is equivalent to a feature extracting segment of an image classification network. The analysis network includes a plurality of convolutional layers sequentially connected. The convolutional layers of the plurality of convolutional layers are in different scales. The analysis network further includes a down-sampling segment disposed between two adjacent convolutional layers of the plurality of convolutional layers. The down-sampling segment transforms the input signal into an output signal having a same scale as the scale of the following adjacent convolutional layer.

Figure 5:
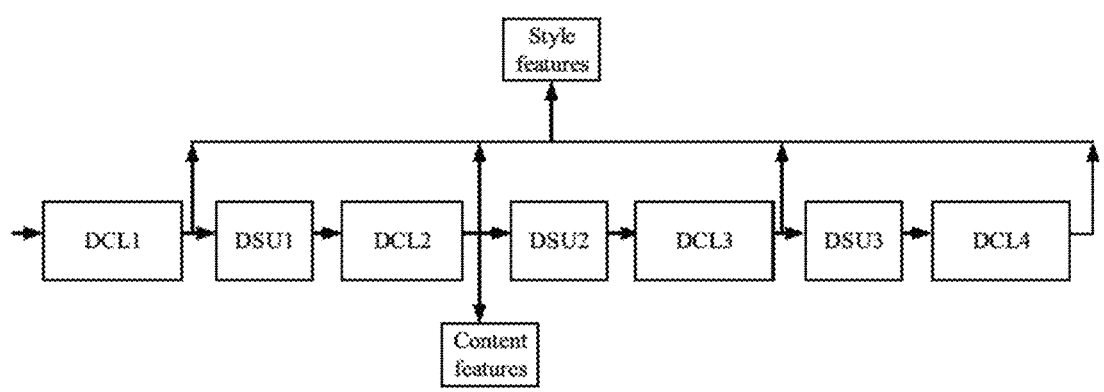
FIG. 5 is a schematic diagram illustrating a structure of an analysis network in some embodiments according to the present disclosure.

FIG. 5 is a schematic diagram illustrating a structure of an analysis network in some embodiments according to the present disclosure. Referring to FIG. 5, an analysis network includes a plurality of convolutional layer, a plurality of down-sampling units (e.g. pooling layer), features of an image in different scales may be extracted from different convolutional layers, and a feature image is output. For example, the analysis network includes a first down-sampling convolutional layer DCL1, a second down-sampling convolutional layer DCL2, a third down-sampling convolutional layer DCL3, and a fourth down-sampling convolutional layer DCL4. The analysis network further includes a first down-sampling unit DSU1, a second down-sampling unit DSU2, and a third down-sampling unit DSU3. Style features may be extracted from the first down-sampling convolutional layer DCL1, the second down-sampling convolutional layer DCL2, the third down-sampling convolutional layer DCL3, and the fourth down-sampling convolutional layer DCL4. Content features may be extracted from the second down-sampling convolutional layer DCL2.

As used herein, the term "content loss" refers to a definition used to evaluate the similarity between a content of one image and a content of another image. An analysis network can separately extract content features from a first image and a second image.

For example, a convolutional layer l of an analysis network includes a plurality of convolutional kernel. A number of the plurality of convolutional kernel is $N_l$. A plurality of feature images are output. A number of the plurality of feature image is $N_l$. A size of a respective one of the plurality of feature image is $M_l$. Therefore, the information output by the convolutional layer l is stored in a matrix $F^l \in R^{N_l \times M_l}$. $F^l_{ij}$ represents a value of j-th position in a feature image output from an i-th convolutional kernel of the convolutional layer l.

For example, subsequent to inputting the first image into the convolutional layer l of the analysis network, a first feature image $P^l$ is output. Subsequent to inputting the second image into the convolutional layer l of the analysis network, a second feature image $F_l$ is output. A content loss between the first image and the second image is defined using the following formula:

$$L_{content} = \frac{1}{2C1} \sum_{ij} (F^l_{ij} - P^l_{ij})^2;$$

Wherein C1 is a constant used for normalizing the result.

As used herein, the term "style loss" refers to a definition used to evaluate the similarity between a style of one image and a style of another image. An analysis network can separately extract style features from a first image and a second image.

For example, subsequent to extracting a style feature from an input image using a convolutional layer l of the analysis network, the convolutional layer output a following Gram matrix:

$$G^l_{ij} = \sum_k F^l_{kj} F^l_{ik};$$

Given that subsequent to extracting a style feature from the first image, the convolutional layer l outputs a Gram matrix $A^l$, and subsequent to extracting a style feature from the second image, the convolutional layer l outputs a Gram matrix $G^l$. A style loss between the first image and the second image obtained from the convolutional layer l is defined using the following formula:

$$E_l = \frac{1}{4N_l^2 M_l^2 C2} \sum_{i,j} (G^l_{ij} - A^l_{ij})^2;$$

Wherein C2 is a constant used for normalizing the result.

The total style losses between the first image and the second image is defined using the following formula:

$$L_{style} = \sum_{l=0}^{L} w_l E_l;$$

Wherein $w_l$ is a weight of a style loss obtained from the convolutional layer l.

In some embodiments, in a convolutional neural network, a convolutional kernel and a bias are obtained by pre-training the convolutional neural network. The convolutional kernel determines how to process an image. The bias determines whether the output from the convolutional kernel should be output to next level, which means the bias acts like a switch. For example, based on different input images, the bias determines whether to turn off or turn on the convolution process performed by a convolutional kernel to achieve different processing effects.

In order for the bias effectively playing its role as an on-off switch, the bias should play a more important part than the convolutional kernel does.

The L1 loss is defined as follows:

$$L_{L1} = \frac{W}{B + \varepsilon};$$

Wherein $\varepsilon$ is a very small positive number for preventing the denominator from being zero. W is an average of absolute values of all convolutional kernels w. B is an average of absolute values of all biases b.

The average W of absolute values of all convolutional kernels w is defined as follows:

$$W = \frac{\Sigma |w|}{C_w};$$

Wherein $C_w$ is a number of all convolutional kernels w.

The average B of absolute values of all biases b is defined as follows:

$$B = \frac{\Sigma |b|}{c_b};$$

Wherein $C_b$ is a number of all biases b.

If the value of the average B of absolute values of all biases b is greater, the value of the L1 loss is smaller.

As used herein, the term "channel" is used at times to indicate a signal path in a neural network.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

It is discovered in the present disclosure that the process of morphing an image using a style of another image by a convolutional neural network in a conventional method typically involves a highly complex convolutional network structure, requiring a huge amount of data processing, resulting a low morphing speed and a long processing time. Accordingly, the conventional method results in a rather poor morphing quality of the processed image, as well as a relatively low operation efficiency. For example, in the conventional method, each convolutional layer of the convolutional network includes excessive numbers of convolutional kernels, and the convolutional layers are interconnected in series. Inevitably, some convolutional kernels from different convolutional layers are engaged in handling a same transaction, leading to the low operation efficiency.

Accordingly, the present disclosure provides, inter alia, a computer-implemented method, an apparatus, and a computer-program product that substantially obviate one or more of the problems due to limitations and disadvantages of the related art. In one aspect, the present disclosure provides a computer-implemented method using a convolutional neural network. The present method uniquely adopts a densely connected segment with the option of cross-scale concatenations in a process of morphing a content image and a style image. Not only the total numbers of convolutional kernels in each convolutional layer can be significantly reduced, the present method also obviates the issue of convolutional kernels from different convolutional layers engaging in a same transaction. In the present method, convolutional kernels of different convolutional layers handle different, non-overlapping transactions, resulting in a significantly higher operation efficiency and much better morphing quality. In some embodiments, the computer-implemented method using a convolutional neural network, includes processing an input image through at least one channel of the convolutional neural network to generate an output image including content features of the input image morphed with style features of a reference style image. Optionally, the at least one channel includes a down-sampling segment, a densely connected segment, and an up-sampling segment sequentially connected together. Optionally, processing the input image through the at least one channel of the convolutional neural network includes processing an input signal through the down-sampling segment to generate a down-sampling segment output; processing the down-sampling segment output through the densely connected segment to generate a densely connected segment output; and processing the densely connected segment output through the up-sampling segment to generate an up-sampling segment output. Optionally, the input signal includes a component of the input image, e.g., a U component, a V component, or a Y component.

Figure 2:
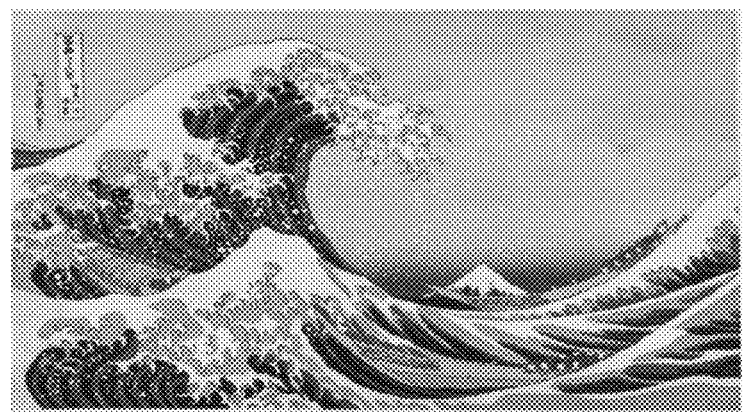
FIG. 2 is a schematic diagram of a reference style image in some embodiments according to the present disclosure.
Figure 3:
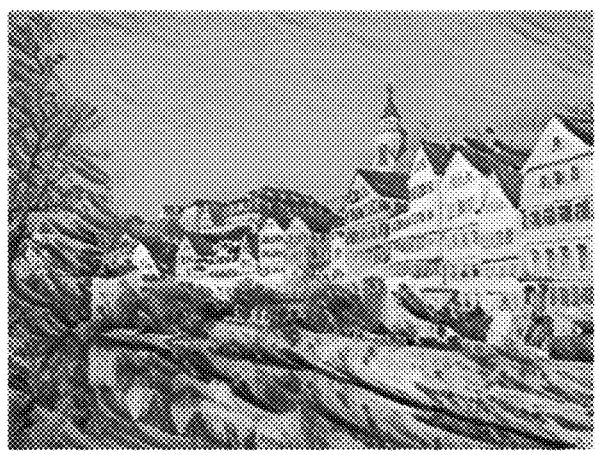
FIG. 3 is a schematic diagram of an output image obtained by morphing an input image with a style of a reference style image using a method in some embodiments according to the present disclosure.

FIG. 1 is a schematic diagram of an original input image of which a style hasn't been morphed with a style of a reference style image in some embodiments according to the present disclosure. FIG. 2 is a schematic diagram of a reference style image in some embodiments according to the present disclosure. FIG. 3 is a schematic diagram of an output image obtained by morphing an input image using a style of a reference style image by a method using a convolutional neural network in some embodiments according to the present disclosure. Referring to FIG. 1 to FIG. 3, subsequent to morphing content features of an input image as shown in FIG. 1 using style features of a reference style image as shown in FIG. 2 using a computer-implemented method herein, an output image as shown in FIG. 3 is obtained.

Parameters of the convolutional neural network are obtained by pre-training the convolutional neural network using a reference style image. Subsequent to pre-training the convolutional neural network, the input image is input in the convolutional neural network. A respective convolutional kernel of the convolutional network adds a style feature of the reference style image to the input image. The convolutional network processes the input image and outputs an output image. The output image keeps the content features of the input image, but possesses at least certain style features of the reference style image. The content features may include sceneries of the input image, objects of the input image, or people of the input image. The style features may include sketch style, ukiyo-e style, or Van Gogh style. Using the method herein, a style of an input image is transformed by morphing content features of an input image using style features of a reference style image.

In some embodiments, a computer-implemented method adopts a convolutional neural network. The computer-implemented method using a convolutional neural network includes processing an input image through at least one channel of the convolutional neural network to generate an output image including content features of the input image morphed with style features of a reference style image.

In some embodiments, the convolutional neural network includes at least one channel. Optionally, the at least one channel includes a down-sampling segment, a densely connected segment, and an up-sampling segment sequentially connected together.

In some embodiments, the computer-implemented method includes processing the input image through the at least one channel of the convolutional neural network. Optionally, processing the input image through the at least one channel of the convolutional neural network includes processing an input signal through the down-sampling segment to generate a down-sampling segment output; processing the down-sampling segment output through the densely connected segment to generate a densely connected segment output; and processing the densely connected output through the up-sampling segment to generate an up-sampling segment output.

In some embodiment, processing the input signal through the down-sampling segment includes processing the input signal through at least one down-sampling unit and at least one convolutional layer in the down-sampling segment. Optionally, down-sampling units and convolutional layers in the down-sampling segment are alternately arranged.

Optionally, a respective down-sampling unit is configured to convert an input into an output having a different scale.

In some embodiments, processing the densely connected segment output through the up-sampling segment includes processing the densely connected segment output through at least one up-sampling unit and at least one convolutional layer in the up-sampling segment. Optionally, the up-sampling units and convolutional layers in the up-sampling segment are alternately arranged. Optionally, a respective up-sampling unit is configured to convert an input into an output having a different scale. Optionally, a total number of down-sampling units in the down-sampling segment is the same as a total number of up-sampling units in the up-sampling segment in a same channel. Optionally, the down-sampling units in the down-sampling segment respectively correspond to the up-sampling units in the up-sampling segment in the same channel.

In some embodiments, processing the down-sampling segment output through the densely connected segment includes processing the down-sampling segment output through at least one densely connected convolutional network module. Optionally, a respective densely connected convolutional network module in the densely connected segment includes a plurality of convolutional blocks sequentially connected. In one example, a respective one of the plurality of convolutional blocks includes at least one convolutional layer.

Figure 6:
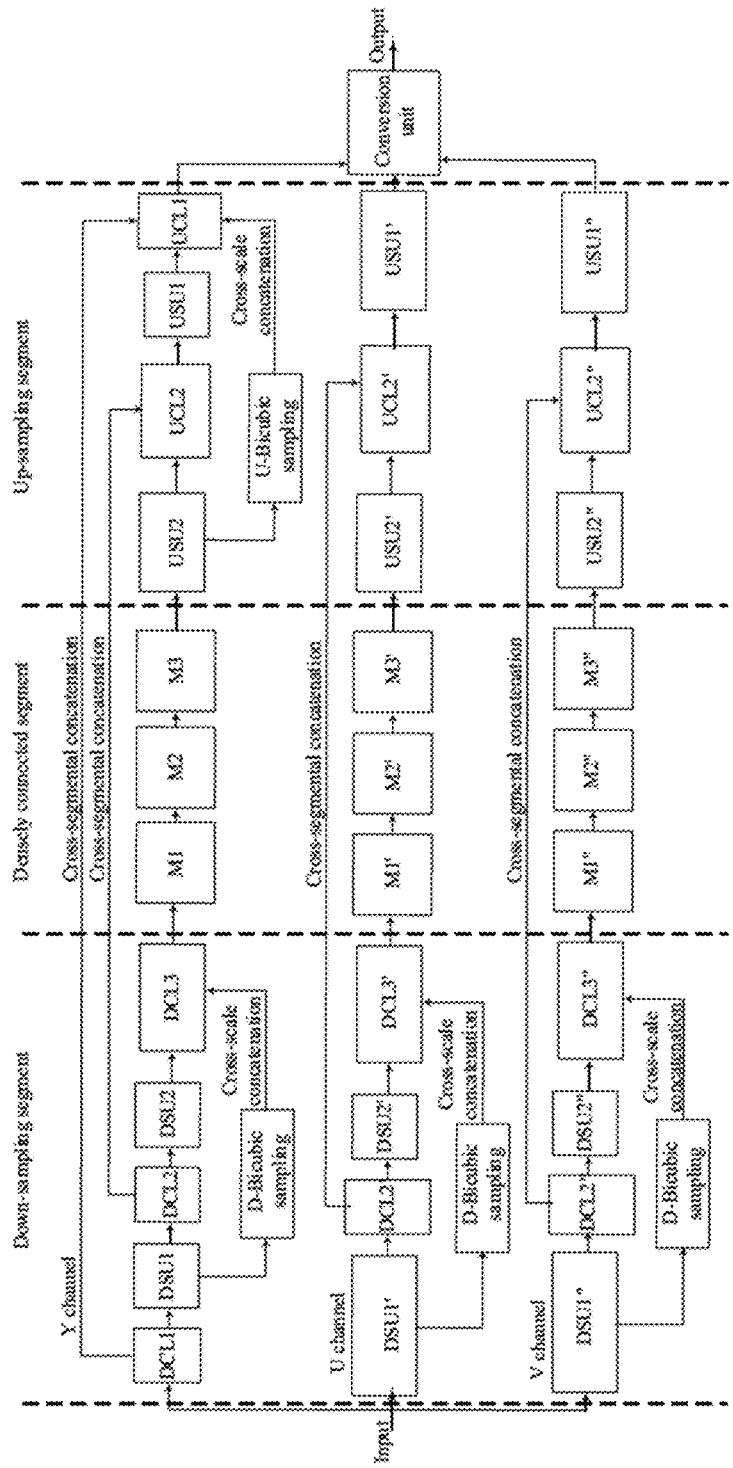
FIG. 6 is a schematic diagram illustrating a structure of a convolutional neural network in some embodiments according to the present disclosure.

FIG. 6 is a schematic diagram illustrating a structure of a convolutional neural network in some embodiments according to the present disclosure. Referring to FIG. 6, in some embodiments, the convolutional neural network includes at least one channel. For example, the convolutional neural network includes a Y channel, a U channel, and a V channel.

In a process from inputting an input image to outputting an output image, a respective channel has a down-sampling segment, a densely connected segment, and an up-sampling segment. For example, an input signal of the input image is processed through the down-sampling segment to generate a down-sampling segment output, the down-sampling segment output is processed through the densely connected segment to generate a densely connected segment output, and the densely connected segment output is processed through the up-sampling segment to generate an up-sampling segment output.

In some embodiments, the down-sampling segment includes at least one down-sampling unit and at least one convolutional layer alternately arranged. Optionally, a down-sampling unit is not directly connected to an adjacent down-sampling layer. Optionally, a convolutional layer is not directly connected to an adjacent convolutional layer. Optionally, a one-to-one relationship may not be present for all down-sampling units and convolutional layers in the down-sampling segment. For example, a total number of the down-sampling units may not be equal to a total number of the convolutional layers in the down-sampling segment.

For example, referring to FIG. 6, the down-sampling segment of Y channel includes a first down-sampling convolutional layer DCL1, a second down-sampling convolutional layer DCL2, a third down-sampling convolutional layer DCL3, a first down-sampling unit DSU1, and a second down-sampling unit DSU2. The first down-sampling convolutional layer DCL1 is not directly connected to the second down-sampling convolutional layer DCL2. For example, the first down-sampling convolutional layer DCL1 is connected to the second down-sampling convolutional layer DCL2 through the first down-sampling unit DSU1. The second down-sampling convolutional layer DCL2 is not directly connected to the third down-sampling convolutional layer DCL3. For example, the second down-sampling convolutional layer DCL2 is connected to the third down-sampling convolutional layer DCL3 through the second down-sampling unit DSU2. The first down-sampling unit DSU1 is not directly connected to the second down-sampling unit DSU2. For example, the first down-sampling unit DSU1 is connected to the second down-sampling unit DSU2 through the second down-sampling convolutional layer DCL2.

In some embodiments, a convolutional layer includes an active layer and a normalization layer.

In some embodiments, different convolutional layers have different scales. Different features (e.g. textures, edges, or objects) of an image behave differently in convolutional layers having different scales. Thus, different features are best obtained by processing the image using different convolutional layers having different scales. Accordingly, an image can be pre-processed to output an output signal having a scale equivalent to a scale of a convolutional kernel of a convolutional layer. Subsequently, the output signal can be processed by the convolutional layer having the equivalent scale to obtain a feature of the image.

For example, referring to FIG. 6, the first down-sampling convolutional layer DCL1 has a first scale, the second down-sampling convolutional layer DCL2 has a second scale, and the third down-sampling convolutional layer DCL3 has a third scale. Optionally, the first scale, the second scale, and the third scale are different.

In some embodiment, the down-sampling units are used to reduce a scale of an input signal to obtain an output signal having a smaller scale which satisfies the requirement of an adjacent down-sampling convolutional layer having a scale the same as the smaller scale.

Optionally, the down-sampling units are pooling layers.

For example, referring to FIG. 6, the first scale of the first down-sampling convolutional layer DCL1 is greater than the second scale of the second down-sampling convolutional layer DCL2, and the second scale of the second down-sampling convolutional layer DCL2 is greater than a third scale of the third down-sampling convolutional layer DCL3. Optionally, the first down-sampling convolutional layer DCL1 has a greatest scale. The second down-sampling convolutional layer DCL2 has a second greatest scale.

In one example, an input signal having the first scale is input in the first down-sampling convolutional layer DCL1. The first down-sampling convolutional layer DCL1 processes the input signal, and outputs a first down-sampling input signal having the first scale. The first down-sampling input signal is input in the first down-sampling unit DSU1. The first down-sampling unit DSU1 reduces the scale of the first down-sampling input signal, and outputs a first down-sampling output signal having the second scale. The first down-sampling output signal is input in the second down-sampling convolutional layer DCL2. The second down-sampling convolutional layer DCL2 processes the first down-sampling output signal, and outputs a second down-sampling input signal having the second scale. The second down-sampling input signal is input in the second down-sampling unit DSU2. The second down-sampling unit DSU2 reduces the scale of the second down-sampling input signal, and outputs a second down-sampling output signal having the third scale. The second down-sampling output signal is input in the third down-sampling convolutional layer DCL3.

In some embodiments, the up-sampling segment includes at least one up-sampling unit and at least one convolutional layer alternately arranged. Optionally, an up-sampling unit is not directly connected to an adjacent up-sampling layer. Optionally, a convolutional layer is not directly connected to an adjacent convolutional layer. Optionally, a one-to-one relationship may not be present for all up-sampling units and convolutional layers in the up-sampling segment. For example, a total number of the up-sampling layers may not be equal to a total number of the convolutional layers in the up-sampling segment.

For example, referring to FIG. 6, the up-sampling segment of Y channel includes a first up-sampling convolutional layer UCL1, a second up-sampling convolutional layer UCL2, a first up-sampling unit USU1, and a second up-sampling unit USU2. The first up-sampling convolutional layer UCL1 is not directly connected to second up-sampling convolutional layer UCL2. The first up-sampling unit USU1 is not directly connected to the second up-sampling unit USU2.

For example, referring to FIG. 6, the first up-sampling convolutional layer UCL1 has a first scale, the second up-sampling convolutional layer UCL2 has a second scale. Optionally, the first scale and the second scale are different.

In some embodiment, the up-sampling units are used to increase a scale of an input signal to obtain an output signal having a greater scale which satisfies the requirement of an adjacent up-sampling convolutional layer having a scale the same as the greater scale.

Optionally, the up-sampling units are Muxer layers.

For example, referring to FIG. 6, the first scale of the first up-sampling convolutional layer UCL1 is greater than the second scale of the second up-sampling convolutional layer UCL2.

In one example, a second up-sampling input signal having the third scale is input in the second up-sampling unit USU2. The second up-sampling unit USU2 increases the scale of the second up-sampling input signal, and outputs a second up-sampling output signal having the second scale. The second up-sampling output signal is input in the second up-sampling convolutional layer UCL2. The second up-sampling convolutional layer UCL2 processes the second up-sampling output signal, and outputs a first up-sampling input signal having a second scale. The first up-sampling input signal is input in the first up-sampling unit USU1. The first up-sampling unit USU1 enlarges the first up-sampling input signal, and outputs a first up-sampling output signal having the first scale. The first up-sampling signal is input in the first up-sampling convolutional layer UCL1.

In some embodiments, a total number of down-sampling units in the down-sampling segment is the same as a total number of up-sampling units in the up-sampling segment in a same channel, allowing that the input image of the convolutional neural network has a scale equivalent a scale of the output image of the convolutional neural network.

For example, referring to FIG. 6, the first down-sampling unit DSU1 corresponds to the first up-sampling unit USU1. The second down-sampling unit DSU2 corresponds to the second up-sampling unit USU2.

In some embodiments, the densely connected segment includes at least one densely connected convolutional network module. Optionally, a respective densely connected convolutional network module in the densely connected segment includes a plurality of convolutional blocks (e.g. dense block) sequentially connected. Optionally, a respective one of the plurality of convolutional blocks includes at least one convolutional layer.

In some embodiments, an input to the respective one of the plurality of convolutional blocks in the respective densely connected convolutional network module includes outputs respectively from any previous convolutional blocks of the plurality of convolutional blocks in the respective densely connected convolutional network module. Optionally, the input to the respective one of the plurality of convolutional blocks in the respective densely connected convolutional network module further includes the input to the respective densely connected convolutional network module. Optionally, the input of the outputs respectively from the any previous convolutional blocks to the respective one of the plurality of convolutional blocks is performed by concatenation. For example, a first output from a first previous convolutional block includes a first vector [x1, x2, x3], a second output from a second previous convolutional block includes a second vector [x4, x5, x6], and the input to the respective one of the plurality of convolutional blocks is performed by concatenation of the first vector and the second vector. In one example, a result of the concatenation is [x1, x2, x3, x4, x5, x6], which is input to the respective one of the plurality of convolutional blocks. In another example, a result of the concatenation is $$\begin{bmatrix} x1 & x2 & x3 \\ x4 & x5 & x6 \end{bmatrix},$$

which is input to the respective one of the plurality of convolutional blocks.

Figure 7:
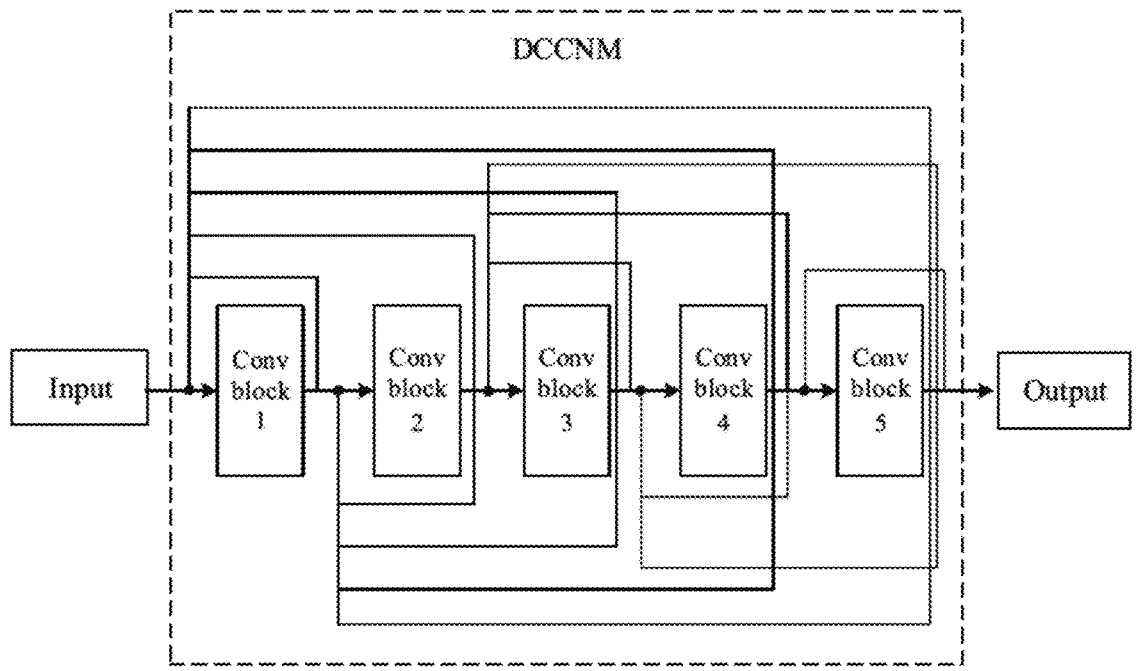
FIG. 7 is a schematic diagram illustrating a structure of a densely connected convolutional network module in some embodiments according to the present disclosure.

FIG. 7 is a schematic diagram illustrating a structure of a densely connected convolutional network module in some embodiments according to the present disclosure. Referring to FIG. 7, for example, a third convolutional block 3 in a densely connected convolutional network module DCCNM receives inputs including an output from the first convolutional block 1, an output from the second convolutional block 2, and an input to the densely connected convolutional network module DCCNM.

In some embodiments, an output from the respective densely connected convolutional network module includes outputs respectively from the plurality of convolutional blocks in the respective densely connected convolutional network module. Optionally, the output from the respectively densely connected convolutional network module further includes the input to the respectively densely connected convolutional network module.

Referring to FIG. 7, for example, an output from the respective densely connected convolutional network module DCCNM includes outputs from the first convolutional block 1, from the second convolutional block 2, from the third convolutional block 3, from a fourth convolutional block 4, a fifth convolutional block 5, and the input to the densely connected convolutional network module DCCNM.

It is discovered in the present disclosure that, by adopting the densely connected convolutional network module, the computational efficiency of transforming image style is greatly improved. The convergence speed of the pre-training process can also be increased, resulting a faster pre-training process.

In some embodiments, the densely connected convolutional network modules have a same structure.

In some embodiments, the respective one of the plurality of convolutional blocks includes two convolutional layers. Optionally, the respective one of the plurality of convolutional blocks includes a first convolutional layer a second convolutional layer. In one example, the first convolutional layer includes a 1*1 convolutional kernel. In another example, the second convolutional layer includes a 3*3 convolutional kernel. For example, the first convolutional layer, also known as bottleneck layer, is used to reduce the dimensionality of a data. The second convolutional layer, also known as convolution layer, is used to perform convolution. So, the respective one of the plurality of convolutional blocks including the first convolutional layer (e.g. bottleneck layer) and the second convolutional layer (e.g. convolution layer) is known as "B+C block".

In some embodiments, the down-sampling segment further includes at least one cross-scale concatenation. In some embodiments, processing the input signal through the down-sampling segment further includes outputting an output from an upstream down-sampling unit (e.g., DSU1 in FIG. 6) to a respective cross-scale concatenation (e.g., the D-Bicubic sampling unit in FIG. 6) and to an upstream convolutional layer (e.g., DCL2 in FIG. 6); further down-sampling the output of the upstream down-sampling unit (e.g., DSU1 in FIG. 6) by the respective cross-scale concatenation (e.g., the D-Bicubic sampling unit in FIG. 6); and inputting a down-sampling output from the respective cross-scale concatenation (e.g., the D-Bicubic sampling unit in FIG. 6) to a downstream convolutional layer (e.g., DCL3 in FIG. 6) of the convolutional layers in the down-sampling segment. Optionally, the downstream convolutional layer and the upstream convolutional layer are of different scales.

Optionally, down-sampling the output from one of the down-sampling units by the at least one cross-scale concatenation in the down-sampling segment is a D-Bicubic sampling.

Figure 8:
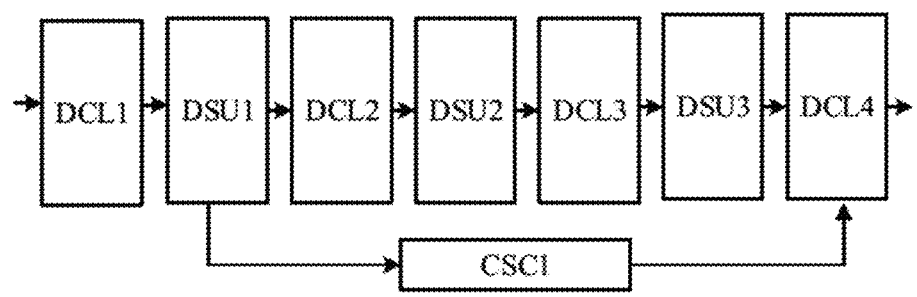
FIG. 8 is a schematic diagram illustrating a structure of down-sampling segment having a cross-scale concatenation in some embodiments according to the present disclosure.

FIG. 8 is a schematic diagram illustrating a structure of down-sampling segment having a cross-scale concatenation in some embodiments according to the present disclosure. Referring to FIG. 8, in some embodiments, the first cross-scale concatenation CSC1 may perform the down-sampling across several scales. In one example, the first cross-scale concatenation CSC1 performs the down-sampling across two scales. For example, referring to FIG. 8, the first down sampling unit DSU1 is the upstream down-sampling unit, the second down-sampling convolutional layer DCL2 is the upstream convolutional layer, and the fourth down-sampling convolutional layer DCL4 is the downstream convolutional layer. So, a first down-sampling unit DSU1 (e.g. upstream down-sampling unit) outputs an output to a first cross-scale concatenation CSC1 and to a second down-sampling convolutional layer DCL2 (e.g. upstream convolutional layer). The first cross-scale concatenation CSC1 further down-samples the output from the first down-sampling unit DSU1 (e.g. the upstream down-sampling unit). The first cross-scale concatenation CSC1 inputs a down-sampling output to a fourth down-sampling convolutional layer DCL4 (e.g. the downstream convolutional layer) of the convolutional layers in the down-sampling segment.

In some embodiments, the up-sampling segment further includes at least one cross-scale concatenation. In some embodiments, processing the input signal through the up-sampling segment further includes outputting an output from an upstream up-sampling unit to a respective cross-scale concatenation and to an upstream convolutional layer; further up-sampling the output from the upstream up-sampling unit by the respective cross-scale concatenation; and inputting an up-sampling output from the respective cross-scale concatenation to a downstream convolutional layer of the convolutional layers in the up-sampling segment. Optionally, the downstream convolutional layer and the upstream convolutional layer are of different scales.

Optionally, up-sampling the output from one of the up-sampling units by the at least one cross-scale concatenation in the up-sampling segment is a U-Bicubic sampling.

Figure 9:
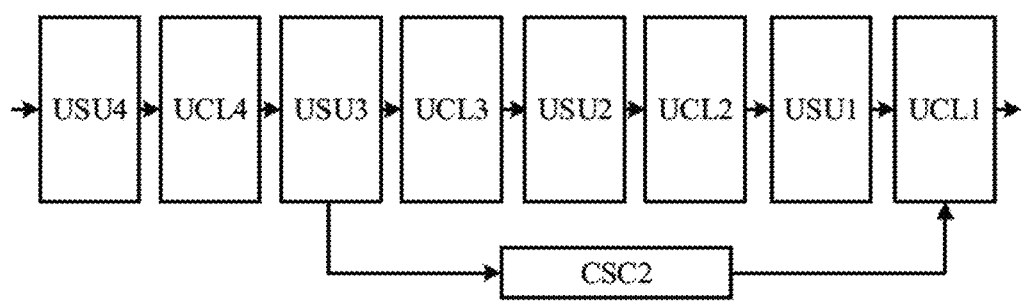
FIG. 9 is a schematic diagram illustrating a structure of up-sampling segment having a cross-scale concatenation in some embodiments according to the present disclosure.

FIG. 9 is a schematic diagram illustrating a structure of up-sampling segment having a cross-scale concatenation in some embodiments according to the present disclosure. Referring to FIG. 9, in some embodiments, the second cross-scale concatenation CSC2 may perform up-sampling across several scales. In one example, the second cross-scale concatenation CSC2 performs up-sampling across two scales. For example, referring to FIG. 8, a third up-sampling unit USU3 is the upstream up-sampling unit, a third up-sampling convolutional layer UCL3 is the upstream convolutional layer, and a first up-sampling convolutional layer UCL1 is a downstream convolutional layer. So, a third up-sampling unit USU3 (e.g. upstream up-sampling unit) outputs an output to a second cross-scale concatenation CSC2 and to a third up-sampling convolutional layer UCL3 (e.g. upstream convolutional layer). The second cross-scale concatenation CSC2 further up-samples the output from the third up-sampling unit USU3 (e.g. upstream up-sampling unit). The second cross-scale concatenation CSC2 generates and inputs an up-sampling output to a first up-sampling convolutional layer UCL1 (e.g. downstream convolutional layer) of the convolutional layers in the up-sampling segment.

In some embodiments, a convolution process may lead to a loss of information. To diminish the adversary effect of the loss of information, referring to FIG. 6, an output from a down-sampling unit can be down-sampled again, and an output after double or several-times down-sampling is directly input into a convolutional layer having a scale corresponding to the scale of the output after double or several-times down-sampling. Optionally, an output from an up-sampling unit can be up-sampled again, and an output after double or several-times up-sampling is directly input into a convolutional layer having a scale corresponding to the scale of the output after double or several-times up-sampling.

In some embodiments, a convolutional layer can receive either signal from an adjacent sampling unit, or signal from an upstream sampling unit. Optionally, the adjacent sampling unit has a scale different from the scale of the upstream sampling unit. By having less convolution process, the loss of information is diminished. Also, a convolutional layer may receive signal from two or more sampling units having different scales, which may make fully use of the features generated from convolutional layers having different scales, and further improve the computational efficiency and the convergence speed of a pre-training process.

In some embodiments, a cross-scale concatenation in the down-sampling segment performs down-sampling since the scales of convolutional layers in the down-sampling segment decrease gradually. Optionally, the cross-scale concatenation in the down-sampling segment is D-Bicubic sampling. A cross-scale concatenation in the up-sampling segment performs up-sampling since the scales of convolutional layers in the up-sampling segment decrease gradually. Optionally, the cross-scale concatenation in the down-sampling segment is U-Bicubic sampling.

In some embodiments, the computer-implemented method further includes inputting outputs from the convolutional layers in the down-sampling units to the convolutional layers in the up-sampling units by at least one cross-segmental concatenation. Optionally, an output from a respective convolutional layer in the down-sampling units is inputted to a respective convolutional layer of a same scale in the up-sampling units. For example, the convolutional neural network further includes at least one cross-segmental concatenation. A convolutional layer in the up-sampling segment may be connected to a convolutional layer of a same scale in the down-sampling segment using a cross-segmental concatenation.

In one example, referring to FIG. 6, the first down-sampling layer DCL1 having first scale in the down-sampling segment of the Y channel may output an output to the first up-sampling layer UCL1 having the same scale (e.g. first scale) in the up-sampling segment of the same channel. In another example, the second down-sampling layer DCL2 having second scale in the down-sampling segment of the Y channel may output an output to second up-sampling layer UCL2 having the same scale (e.g. second scale) in the up-sampling segment in the same channel.

By using cross-segment concatenation, a signal may be processed with less convolution processes, resulting in less information loss, higher computational efficiency, and faster convergence speed of a pre-training process.

In some embodiments, the computer-implemented method includes processing the input image through at least one channel of the convolutional neural network. Optionally, processing the input image through at least one channel of the convolutional neural network includes processing a Y component of the input image through a Y channel of the convolutional neural network; processing a U component of the input image through a U channel of the convolutional neural network; and processing a V component of the input image through a V channel of the convolutional neural network. Optionally, the Y component, the U component, and the V component are components of the input image in a YUV space. In one example, the YUV space is a YUV420 space. In another example, the YUV space is a YUV422 space. For example, the signal in the convolutional neural network is processed with the coding format YUV420, alternatively, the signal in the convolutional neural network is processed with the coding format YUV422. The Y channel, the U channel, and the V channel denote that outputs from these channels are a Y component output, a U component output, and a V component output, respectively. Optionally, the inputs to the Y channel, the U channel, and the V channel are a Y component, a U component, and a V component, respectively. Optionally, an R component, a G component, and a B component are input into the convolutional neural network, converted into a Y component, a U component, and a V component, respectively, therein, and then respectively input into the Y channel, the U channel, and the V channel, respectively.

In some embodiments, using the YUV space is performing a chroma sampling on an input image. The Y component of the input image enters Y channel. The U component of the input image enters U channel. The V component of the input image enters V channel. By separating input signal of the input image into three groups, a respective channel processing signal in a component from a group of the Y component, the U component, and the V component, to reduce the computation burden and to enhance the processing speeding. The U component and the V component has a relative low impact on the display effect of an image, so processing different components in different channels will not have significant effect on the image display.

In some embodiments, the convolutional neural network generally adopt RGB space. Optionally, the convolutional neural network uses a deep-learning method. After the convolutional neural network is pre-trained, the convolutional neural network can also convert the RGB space into the YUV space.

In some embodiments, down-sampling segments and up-sampling segments of the Y component, the U component, and the V component include convolutional layers of a plurality of different scales. Optionally, a convolutional layer of a greatest scale is present in a down-sampling segment and an up-sampling segment of the Y component. Optionally, a convolutional layer of the greatest scale is absent in down-sampling segments and up-sampling segments of the U component and the V component.

Optionally, a convolutional layer of a second greatest scale in the down-sampling segments of the U component and the V component is preceded by a down-sampling unit but not by any convolutional layer. Optionally, a convolutional layer of a second greatest scale in the up-sampling segments of the U component and the V component is succeeded by an up-sampling unit but not by any convolutional layer.

Referring to FIG. 6, in some embodiments, in the down-sampling segment of the Y channel, Y channel includes a first down-sampling layer DCL1 having a first scale to perform convolution process on the input image. In the down-sampling segments of the U channel and V channel, there is no first down-sampling layer having a first scale. In the down-sampling segments of the U channel and V channel, the down-sampling segments of the U channel and V channel include merely first down-sampling units. For example, the first' down-sampling unit DSU1' in U channel down-samples the U component (having first scale) of the input image to obtain an output signal having second scale. The first' down-sampling unit DSU1" in V channel down-samples the V component (having first scale) of the input image to obtain an output signal having second scale.

Referring to FIG. 6, in some embodiments, in the up-sampling segment of the Y channel, Y channel includes a first up-sampling layer UCL1 having a first scale to perform convolution process on the input signal. In the up-sampling segments of the U channel and V channel, there is no first up-sampling layer having a first scale. In the up-sampling segments of the U channel and V channel, the up-sampling segments of the U channel and V channel include merely first up-sampling units. For example, the first' up-sampling unit USU1' in U channel up-samples the U component (having second scale) of the input image to obtain an output signal having first scale. The first' up-sampling unit USU1" in V channel up-samples the V component (having second scale) of the input image to obtain an output signal having first scale.

In some embodiments, the U component and V component have less impact on image display, the convolution process in first scale can be omitted. The first down-sampling convolutional layer, the first up-sampling convolutional layer can be omitted, resulting a great decrease in the amount of calculation and a higher processing speed.

In some embodiments, the Y component has a significant impact on image display, the first down-sampling convolutional layer, the first up-sampling convolutional layer should not be omitted. For example, the up-sampling segment of Y channel includes the first up-sampling convolutional layer UCL1. The down-sampling segment of Y channel includes the first down-sampling convolutional layer DCL1.

In some embodiments, the computer-implemented method further includes converting outputs from the Y channel, the U channel, and the V channel into the output image in an RGB space.

Optionally, the convolutional neural network include a conversion unit. The conversion unit converts outputs from the Y channel, the U channel, and the V channel into the output image in an RGB space. Optionally, the signal output by the convolutional neural network is in RGB space.

Optionally, the convolutional neural network doesn't include a conversion unit. The signal output by the convolutional neural network is in YUV space.

In some embodiments, a convolutional neural network should be pre-trained prior to using the convolutional neural network to process an input image.

Figure 10:
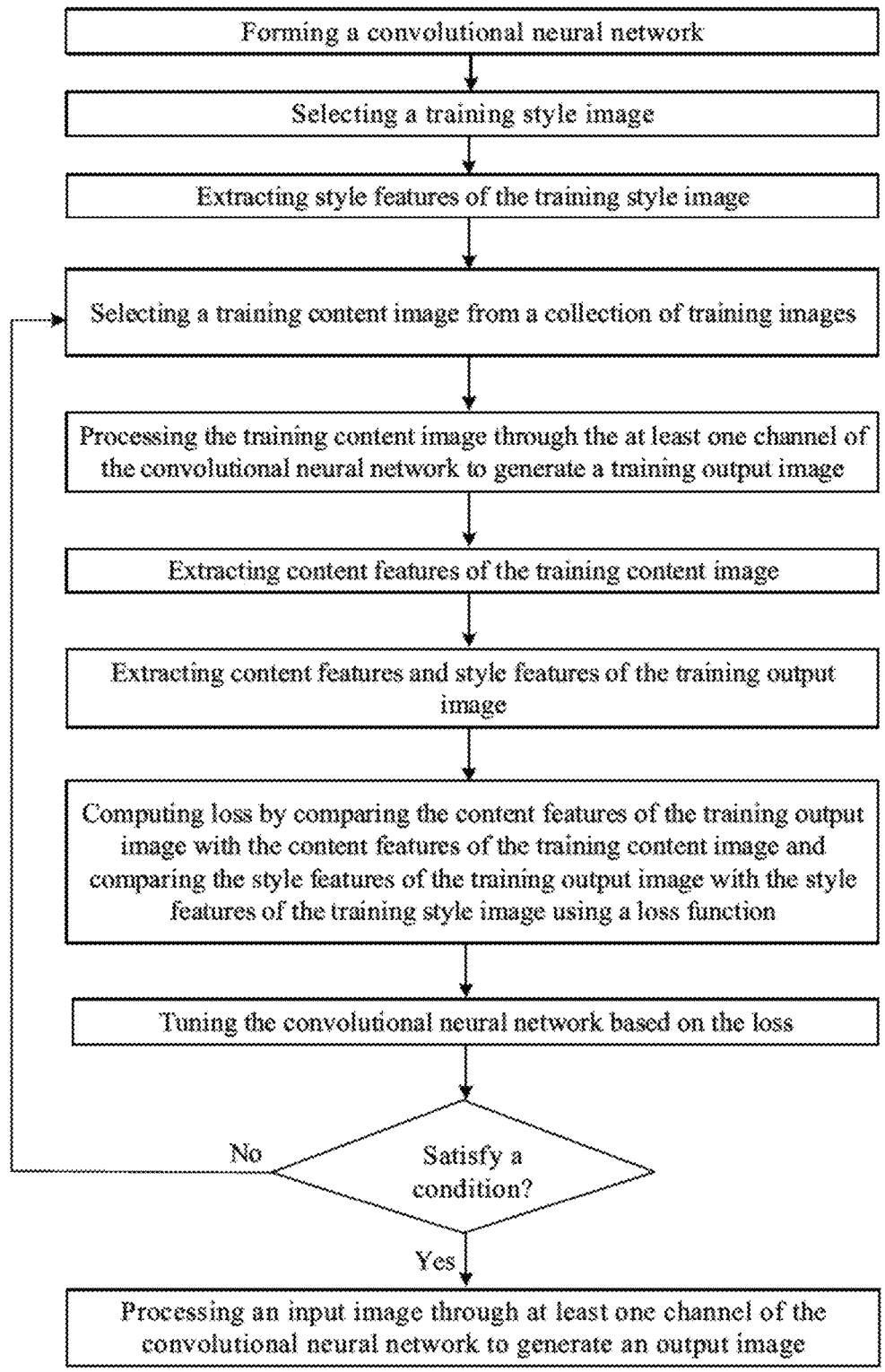
FIG. 10 is a flow chart illustrating a computer-implemented method of morphing an input image with a style of a reference style image.

FIG. 10 is a flow chart illustrating a computer-implemented method of morphing an input image with a style of a reference style image. In some embodiments, referring to FIG. 10, the computer-implemented method further includes pre-training the convolutional neural network. Optionally, pre-training the convolutional neural network includes selecting a training style image; extracting style features of the training style image using an analysis network; selecting a training content image from a collection of training images; excluding the training content image from the collection of training images; extracting content features of the training content image using the analysis network; processing the training content image through the at least one channel of the convolutional neural network to generate a training output image including the content features of the training content image morphed with the style features of the training style image; extracting content features and style features of the training output image using the analysis network; computing loss by comparing the content features of the training output image with the content features of the training content image and comparing the style features of the training output image with the style features of the training style image using a loss function; and tuning the convolutional neural network based on the loss.

In some embodiments, the computer-implemented method further includes forming a convolutional neural network. Optionally, a convolutional neural network with the structure shown in FIG. 6 is formed. For example, all parameters of the newly formed convolutional neural network are in an initial status, which would not allow the convolutional neural network to generate an output image morphed with a different style.

In some embodiments, a training style image is selected to pre-train the convolutional neural network. Optionally, when the training style image is used to pre-train the convolutional neural network, subsequent to the pre-training, the convolutional network can process input image other than the training style image, and output an output image including content features of the input image morphed with style feature of the training style image.

In some embodiments, extracting style features of the training style image includes input the training style image in an analysis network, extracting style features of the training style image using the analysis network. For example, the style features includes detailed style features of an image, such as colors of the overall image, a tone of the overall image, types of stripes in the image, color relationships between adjacent pixels of the image.

Optionally, the style features includes outputs from at least one of the convolutional layer. Referring to FIG. 5, outputs from the convolutional layers can be style features. For example, the style features of an input image is formed by a group of feature images of the input image. Convolutional layers having different scales output feature images containing different features (e.g. a feature image containing features of texture, a feature image containing features of edge). To comprehensively collect style features of an input image, multiple convolutional layers should be used. For example, style features are generated from the first down-sampling layer DCL1, the second down-sampling layer DCL2, the third down-sampling layer DCL3, and the fourth down-sampling layer DCL4.

In some embodiments, selecting a training content image from a collection of training images further includes excluding the training content image from the collection of training images. For example, to avoid selecting a same image as a training content image for more than once, a training image selected as the training content image from a collection of training images should be excluded from the collection of training images.

In some embodiments, processing the training content image includes input the training content image into the convolutional neural network, morphing the training content image using the convolutional neural network, and generating a training output image. For example, during the pre-training process, a result of the style transforming by morphing the training content image using the convolutional neural network may not be close enough to the style of the training style image. As the pre-training progresses, the training output image obtains a style closer and closer to the style of the training style image.

In some embodiment, extracting content features of the training content image includes inputting the training content image in the analysis network, extracting content features of the training content image from the analysis network. For example, the content features of an image includes sceneries in the image, objects in the image, or people in the image. The extracted content features are derived from the actual contents of the image, rather than from the tags of the contents.

Optionally, content features are generated from a convolutional layer of the convolutional neural network. Referring to FIG. 5, content features are generated from one of the convolutional layers. For example, content features are generated from the second down-sampling layer DCL2. Because the contents of an image are "holistic" to the image, regardless of the scale of the image. Different convolutional layers of different scales generate substantially same content features, so content features can be obtained from only one convolutional layer.

In some embodiments, extracting content features and style features of the training output image includes inputting the training output image in the analysis network, extracting content features and style features of the training output image using the analysis network. Optionally, the number of the content features extracted from the training output image is equal to the number of the content features extracted from the training content image. The scales of the content features extracted from the training output image corresponds to the scales of the content features extracted from the training content image. Optionally, the number of the style features extracted from the training output image is equal to the number of the style features extracted from the training style image. The scales of the style features extracted from the training output image corresponds to the scales of the style features extracted from the training style image.

In some embodiments, extracting style features of the training style image, extracting content features of the training content image, and extracting content features and style features of the training output image are performed using an analysis network. Optionally, the analysis network includes a plurality of convolutional layers of different scales sequentially connected, and a plurality of down-sampling units respectively between adjacent convolutional layers of the plurality of convolutional layers of different scales. Optionally, a respective down-sampling unit is configured to convert an input into an output having a different scale.

In some embodiments, computing loss includes comparing the content features of the training output image with the content features of the training content image and comparing the style features of the training output image with the style features of the training style image using a loss function.

For example, the content features of the training output image cannot be exactly the same as the content features of the training content image, and the style features of the training output image cannot be exactly the same as the style features of the training style image. Using a loss function, the difference between the content features of the training output image and the content features of the training content image, and the difference between the style features of the training output image and the style features of the training style image, can be calculated to generate a loss. The convolutional neural network can be tuned based on the calculated loss.

Optionally, the loss includes a L1 loss $L_{L1}$. Using the $L_{L1}$, suitable parameters for convolutional kernel and for bias can be obtained in a short time, which may shorten the time period of pre-training process.

Optionally, the loss includes a content loss $L_{content}$ and a style loss $L_{style}$. The content loss $L_{content}$ and the style loss $L_{style}$ may be used to more accurately evaluate the difference between the content features of the training output image and the content features of the training content image, and difference between the style features of the training output image and the style features of the training style image.

Optionally, by obtaining multiple types of losses, a respective loss of the multiple types of losses can be used to independently tune the convolutional neural network. Optionally, the multiple types of losses may be used together to tune the convolutional neural network. For example, the multiple types of losses can be calculated to generate a total loss $L_{total}$. The total loss $L_{total}$ can be defined by the following formula:

$$L_{total} = \alpha L_{content} + \beta L_{style} + \chi L_{L1};$$

Wherein, $\alpha$ is a weight of the content loss $L_{content}$, $\beta$ is a weight of the style loss $L_{style}$, $\chi$ is a weight of L1 loss $L_{L1}$.

Optionally, the loss includes a L1 loss, a content loss, and a style loss. Optionally, the L1 loss is calculated by $$L_{L1} = \frac{W}{B + \varepsilon},$$

wherein $\varepsilon$ is a positive number;

$$W = \frac{\Sigma |w|}{C_w},$$

W is an average of absolute values of all convolutional kernels, $C_w$ stands for a total number of all convolutional kernels, w is a value of each of the convolutional kernels; and $$B = \frac{\Sigma |b|}{c_b},$$

B is an average of absolute values of all biases, $C_b$ stands for a total number of all biases, b is a value of each of the biases In some embodiments, tuning the convolutional neural network based on the loss includes tuning parameters of the convolutional neural network based on the loss. Optionally, the loss includes the content loss $L_{content}$. Optionally, the loss includes the style loss $L_{style}$. Optionally, the loss includes the L1 loss $L_{L1}$. Optionally, the loss includes the total loss $L_{total}$. By tuning the convolutional neural network, the result of transforming an image is improved.

In some embodiments, the pre-training further includes determining whether a condition is satisfied. When the condition is satisfied, the pre-training is accomplished. When the condition haven't been satisfied, the pre-training further includes reiterating pre-training the convolutional neural network using a different training content image or using a different training style image.

By excluding the training content image from the collection of training images, reiterating pretraining the convolutional neural network will not use a training content image used before.

By reiterating pre-training, the training output image can be better morphed with the style of the training style image. The convolutional neural network can process more input images. Optionally, as the accomplishment of the pre-training, the convolutional neural network can morph most content image using the style of the training style image.

Various appropriate conditions may be set. Examples of suitable conditions includes, but are not limited to, loss converging, loss keeping under a value, all the image in the collection of training images being used, and times of reiterating pre-training under a value.

Subsequent to the pre-training, the convolutional neural network can be used for transforming style of an input image. For example, subsequent to determining that the condition is satisfied, an input image can be input in the convolutional neural network, and the input image is processed through at least one channel of the convolutional neural network to generate an output image including content features of the input image morphed with style features of the training style image (e.g. a reference style image).

In some embodiments, the process time of using a method herein to generate an output image including content features of the input image morphed with style features of a reference style image is shorter than the processing time of using a conventional method.

Table 1 shows the processing time to generate an output image including content features of the input image morphed with style features of a reference style image using a method disclosure in some embodiments of the present disclosure or using a conventional method.

TABLE 1 processing time to generate an output image.

| Image resolution | The processing time (s) using a conventional method | The processing time (s) using a method in some embodiments of the present disclosure |
|---|---|---|
| 640*480 | 0.192 | 0.050 |
| 1024*768 | 0.457 | 0.136 |
| 1280*720 | 0.533 s | 0.151 |
| 1280*960 | 0.703 s | 0.214 |
| 1280*1024 | 0.749 s | 0.219 |
| 1920*1080 | 1.175 s | 0.330 |
| 3840*2160 | Memory overflow | 1.420 |

Referring to the above table, the processing time using a method in some embodiments of the present disclosure is three times to four times less than the processing time (s) using a conventional method. The method in some embodiments of the present disclosure can reduce the computation burden, and improve the processing speed. Also, the method in some embodiments of the present disclosure can process image which cannot be processed by the conventional method.

In another aspect, the present disclosure provides an apparatus for generating a composite image includes a memory; and one or more processors. Optionally, the memory and the one or more processors are connected with each other. Optionally, the memory stores computer-executable instructions for controlling the one or more processors to process an input image through at least one channel of a convolutional neural network to generate an output image including content features of the input image morphed with style features of a reference style image. In one example, the at least one channel includes a down-sampling segment, a densely connected segment, and an up-sampling segment sequentially connected together. Optionally, the memory stores computer-executable instructions for controlling the one or more processors to process an input signal through the down-sampling segment to generate a down-sampling segment output; process the down-sampling segment output through the densely connected segment to generate a densely connected segment output; and process the densely connected segment output through the up-sampling segment to generate an up-sampling segment output In some embodiments, the memory stores computer-executable instructions for controlling the one or more processors to process the input signal through the down-sampling segment. Optionally, the memory stores computer-executable instructions for controlling the one or more processors to process the input signal through at least one down-sampling unit and at least one convolutional layer in the down-sampling segment. For example, down-sampling units and convolutional layers in the down-sampling segment are alternately arranged; and a respective down-sampling unit is configured to convert an input into an output having a different scale.

In some embodiments, the memory stores computer-executable instructions for controlling the one or more processors to process the densely connected segment output through the up-sampling segment. Optionally, the memory stores computer-executable instructions for controlling the one or more processors to process the densely connected segment output through at least one up-sampling unit and at least one convolutional layer in the up-sampling segment. For example, up-sampling units and convolutional layers in the up-sampling segment are alternately arranged. A respective up-sampling unit is configured to convert an input into an output having a different scale. A total number of down-sampling units in the down-sampling segment is the same as a total number of up-sampling units in the up-sampling segment in a same channel. And the down-sampling units in the down-sampling segment respectively correspond to the up-sampling units in the up-sampling segment in the same channel.

In some embodiments, the memory stores computer-executable instructions for controlling the one or more processors to process the down-sampling segment output through the densely connected segment. Optionally, the memory stores computer-executable instructions for controlling the one or more processors to process the down-sampling segment output through at least one densely connected convolutional network module. For example, a respective densely connected convolutional network module in the densely connected segment includes a plurality of convolutional blocks sequentially connected, a respective one of the plurality of convolutional blocks including at least one convolutional layer. An input to the respective one of the plurality of convolutional blocks in the respective densely connected convolutional network module includes outputs respectively from any previous convolutional blocks of the plurality of convolutional blocks in the respective densely connected convolutional network module. An output from the respective densely connected convolutional network module includes outputs respectively from the plurality of convolutional blocks in the respective densely connected convolutional network module. Optionally, the input of the outputs respectively from the any previous convolutional blocks to the respective one of the plurality of convolutional blocks is performed by concatenation. For example, a first output from a first previous convolutional block includes a first vector [x1, x2, x3], a second output from a second previous convolutional block includes a second vector [x4, x5, x6], and the input to the respective one of the plurality of convolutional blocks is performed by concatenation of the first vector and the second vector. In one example, a result of the concatenation is [x1, x2, x3, x4, x5, x6], which is input to the respective one of the plurality of convolutional blocks. In another example, a result of the concatenation is $$\begin{bmatrix} x1 & x2 & x3 \\ x4 & x5 & x6 \end{bmatrix},$$

which is input to the respective one of the plurality of convolutional blocks.

Optionally, the respective one of the plurality of convolutional blocks includes a first convolutional layer including a 1*1 convolutional kernel and a second convolutional layer including a 3*3 convolutional kernel.

In some embodiments, the down-sampling segment further includes at least one cross-scale concatenation.

In some embodiments, the memory stores computer-executable instructions for controlling the one or more processors to process the input signal through the down-sampling segment. Optionally, the memory stores computer-executable instructions for controlling the one or more processors to output an output from an upstream down-sampling unit to a respective cross-scale concatenation and to an upstream convolutional layer; further down-sample the output from the upstream down-sampling unit by the respective cross-scale concatenation; and input a down-sampling output from the respective cross-scale concatenation to a downstream convolutional layer of the convolutional layers in the down-sampling segment. Optionally, the downstream convolutional layer and the upstream convolutional layer are of different scales.

Optionally, down-sampling the output from one of the down-sampling units by the at least one cross-scale concatenation in the down-sampling segment is a D-Bicubic sampling.

In some embodiments, an up-sample segment further includes at least one cross-scale concatenation.

In some embodiments, the memory stores computer-executable instructions for controlling the one or more processors to process the input signal through the up-sampling segment. Optionally, the memory stores computer-executable instructions for controlling the one or more processors to output an output from an upstream up-sampling unit to a respective cross-scale concatenation and to an upstream convolutional layer, further up-sample the output from the upstream up-sampling unit by the respective cross-scale concatenation; and input an up-sampling output from the respective cross-scale concatenation to a downstream convolutional layer of the convolutional layers in the up-sampling segment. Optionally, the downstream convolutional layer and the upstream convolutional layer are of different scales.

Optionally, up-sampling the output from one of the up-sampling units by the at least one cross-scale concatenation in the up-sampling segment is a U-Bicubic sampling.

In some embodiments, the memory stores computer-executable instructions for controlling the one or more processors to input outputs from the convolutional layers in the down-sampling units to the convolutional layers in the up-sampling units by at least one cross-segmental concatenation. Optionally, an output from a respective convolutional layer in the down-sampling units is inputted to a respective convolutional layer of a same scale in the up-sampling units.

In some embodiments, the memory stores computer-executable instructions for controlling the one or more processors to process the input image through at least one channel of the convolutional neural network. Optionally, the memory stores computer-executable instructions for controlling the one or more processors to process a Y component of the input image through a Y channel of the convolutional neural network; process a U component of the input image through a U channel of the convolutional neural network; and process a V component of the input image through a V channel of the convolutional neural network. Optionally, the Y component, the U component, and the V component are components of the input image in a YUV space. Optionally, the YUV space is a YUV420 space or a YUV422 space. The Y channel, the U channel, and the V channel denote that outputs from these channels are a Y component output, a U component output, and a V component output, respectively. Optionally, the inputs to the Y channel, the U channel, and the V channel are a Y component, a U component, and a V component, respectively. Optionally, an R component, a G component, and a B component are input into the convolutional neural network, converted into a Y component, a U component, and a V component, respectively, therein, and then respectively input into the Y channel, the U channel, and the V channel, respectively.

In some embodiments, down-sampling segments and up-sampling segments of the Y component, the U component, and the V component includes convolutional layers of a plurality of different scales. Optionally, a convolutional layer of a greatest scale is present in a down-sampling segment and an up-sampling segment of the Y component and is absent in down-sampling segments and up-sampling segments of the U component and the V component. Optionally, a convolutional layer of a second greatest scale in the down-sampling segments of the U component and the V component is preceded by a down-sampling unit but not by any convolutional layer. Optionally, a convolutional layer of a second greatest scale in the up-sampling segments of the U component and the V component is succeeded by an up-sampling unit but not by any convolutional layer.

In some embodiments, the memory stores computer-executable instructions for controlling the one or more processors to convert outputs from the Y channel, the U channel, and the V channel into the output image in an RGB space In some embodiments, the memory stores computer-executable instructions for controlling the one or more processors to pre-train the convolutional neural network. Optionally, the memory stores computer-executable instructions for controlling the one or more processors to select a training style image; extract style features of the training style image using an analysis network; select a training content image from a collection of training images; exclude the training content image from the collection of training images; extract content features of the training content image using the analysis network; process the training content image through the at least one channel of the convolutional neural network to generate a training output image including the content features of the training content image morphed with the style features of the training style image; extract content features and style features of the training output image using the analysis network; compute loss by comparing the content features of the training output image with the content features of the training content image and comparing the style features of the training output image with the style features of the training style image using a loss function; and tune the convolutional neural network based on the loss.

In some embodiments, the memory stores computer-executable instructions for controlling the one or more processors to reiterate pre-training the convolutional neural network using a different training content image or using a different training style image.

Optionally, the loss includes a L1 loss, a content loss, and a style loss. Optionally, the L1 loss is calculated by $$L_{L1} = \frac{W}{B+\varepsilon},$$

wherein $\varepsilon$ is a positive number;

$$W = \frac{\Sigma|w|}{c_w},$$

W is an average of absolute values of all convolutional kernels, C, stands for a total number of all convolutional kernels, w is a value of each of the convolutional kernels; and $$B = \frac{\Sigma|b|}{c_b},$$

B is an average of absolute values of all biases, $C_b$ stands for a total number of all biases, b is a value of each of the biases In some embodiments, the memory stores computer-executable instructions for controlling the one or more processors to extract style features of the training style image, extract content features of the training content image, and extract content features and style features of the training output image using an analysis network including a plurality of convolutional layers of different scales sequentially connected, and a plurality of down-sampling units respectively between adjacent convolutional layers of the plurality of convolutional layers of different scales, a respective down-sampling unit configured to convert an input into an output having a different scale.

In another aspect, the present disclosure also provides a computer-program product includes a non-transitory tangible computer-readable medium having computer-readable instructions thereon. Optionally, the computer-readable instructions are executable by a processor to cause the processor to process an input image through at least one channel of a convolutional neural network to generate an output image including content features of the input image morphed with style features of a reference style image. Optionally, the at least one channel includes a down-sampling segment, a densely connected segment, and an up-sampling segment sequentially connected together.

In some embodiments, the computer-program product has computer-readable instructions for controlling one or more processors to process an input signal through the down-sampling segment to generate a down-sampling segment output; process the down-sampling segment output through the densely connected segment to generate a densely connected segment output; and process the densely connected segment output through the up-sampling segment to generate an up-sampling segment output.

In some embodiments, the computer-program product has computer-readable instructions for controlling one or more processors to process the input signal through the down-sampling segment. Optionally, the computer-program product has computer-readable instructions for controlling one or more processors to process the input signal through at least one down-sampling unit and at least one convolutional layer in the down-sampling segment. For example, down-sampling units and convolutional layers in the down-sampling segment are alternately arranged; and a respective down-sampling unit is configured to convert an input into an output having a different scale.

In some embodiments, the computer-program product has computer-readable instructions for controlling one or more processors to process the densely connected segment output through the up-sampling segment. Optionally, the computer-program product has computer-readable instructions for controlling one or more processors to process the densely connected segment output through at least one up-sampling unit and at least one convolutional layer in the up-sampling segment. For example, up-sampling units and convolutional layers in the up-sampling segment are alternately arranged. A respective up-sampling unit is configured to convert an input into an output having a different scale. A total number of down-sampling units in the down-sampling segment is the same as a total number of up-sampling units in the up-sampling segment in a same channel. And the down-sampling units in the down-sampling segment respectively correspond to the up-sampling units in the up-sampling segment in the same channel.

In some embodiments, the computer-program product has computer-readable instructions for controlling one or more processors to process the down-sampling segment output through the densely connected segment. Optionally, the computer-program product has computer-readable instructions for controlling one or more processors to process the down-sampling segment output through at least one densely connected convolutional network module. For example, a respective densely connected convolutional network module in the densely connected segment includes a plurality of convolutional blocks sequentially connected, a respective one of the plurality of convolutional blocks including at least one convolutional layer. An input to the respective one of the plurality of convolutional blocks in the respective densely connected convolutional network module includes outputs respectively from any previous convolutional blocks of the plurality of convolutional blocks in the respective densely connected convolutional network module. An output from the respective densely connected convolutional network module includes outputs respectively from the plurality of convolutional blocks in the respective densely connected convolutional network module. Optionally, the input of the outputs respectively from the any previous convolutional blocks to the respective one of the plurality of convolutional blocks is performed by concatenation. For example, a first output from a first previous convolutional block includes a first vector [x1, x2, x3], a second output from a second previous convolutional block includes a second vector [x4, x5, x6], and the input to the respective one of the plurality of convolutional blocks is performed by concatenation of the first vector and the second vector. In one example, a result of the concatenation is [x1, x2, x3, x4, x5, x6], which is input to the respective one of the plurality of convolutional blocks. In another example, a result of the concatenation is $$\begin{bmatrix} x1 & x2 & x3 \\ x4 & x5 & x6 \end{bmatrix},$$

which is input to me respective one of the plurality of convolutional blocks.

Optionally, the respective one of the plurality of convolutional blocks includes a first convolutional layer including a 1*1 convolutional kernel and a second convolutional layer including a 3*3 convolutional kernel.

In some embodiments, the down-sampling segment further includes at least one cross-scale concatenation.

In some embodiments, the computer-program product has computer-readable instructions for controlling one or more processors to process the input signal through the down-sampling segment. Optionally, the computer-program product has computer-readable instructions for controlling one or more processors to output an output from an upstream down-sampling unit to a respective cross-scale concatenation and to an upstream convolutional layer; further down-sample the output from the upstream down-sampling unit by the respective cross-scale concatenation; and input a down-sampling output from the respective cross-scale concatenation to a downstream convolutional layer of the convolutional layers in the down-sampling segment. Optionally, the downstream convolutional layer and the upstream convolutional layer are of different scales.

Optionally, down-sampling the output from one of the down-sampling units by the at least one cross-scale concatenation in the down-sampling segment is a D-Bicubic sampling.

In some embodiments, an up-sample segment further includes at least one cross-scale concatenation.

In some embodiments, the computer-program product has computer-readable instructions for controlling one or more processors to process the input signal through the up-sampling segment. Optionally, the computer-program product has computer-readable instructions for controlling one or more processors to output an output from an upstream up-sampling unit to a respective cross-scale concatenation and to an upstream convolutional layer; further up-sample the output from the upstream up-sampling unit by the respective cross-scale concatenation; and input an up-sampling output from the respective cross-scale concatenation to a downstream convolutional layer of the convolutional layers in the up-sampling segment. Optionally, the downstream convolutional layer and the upstream convolutional layer are of different scales.

Optionally, up-sampling the output from one of the up-sampling units by the at least one cross-scale concatenation in the up-sampling segment is a U-Bicubic sampling.

In some embodiments, the computer-program product has computer-readable instructions for controlling one or more processors to input outputs from the convolutional layers in the down-sampling units to the convolutional layers in the up-sampling units by at least one cross-segmental concatenation. Optionally, an output from a respective convolutional layer in the down-sampling units is inputted to a respective convolutional layer of a same scale in the up-sampling units.

In some embodiments, the computer-program product has computer-readable instructions for controlling one or more processors to process the input image through at least one channel of the convolutional neural network. Optionally, the computer-program product has computer-readable instructions for controlling one or more processors to process a Y component of the input image through a Y channel of the convolutional neural network; process a U component of the input image through a U channel of the convolutional neural network; and process a V component of the input image through a V channel of the convolutional neural network. Optionally, the Y component, the U component, and the V component are components of the input image in a YUV space. Optionally, the YUV space is a YUV420 space or a YUV422 space. The Y channel, the U channel, and the V channel denote that outputs from these channels are a Y component output, a U component output, and a V component output, respectively. Optionally, the inputs to the Y channel, the U channel, and the V channel are a Y component, a U component, and a V component, respectively. Optionally, an R component, a G component, and a B component are input into the convolutional neural network, converted into a Y component, a U component, and a V component, respectively, therein, and then respectively input into the Y channel, the U channel, and the V channel, respectively.

In some embodiments, down-sampling segments and up-sampling segments of the Y component, the U component, and the V component includes convolutional layers of a plurality of different scales. Optionally, a convolutional layer of a greatest scale is present in a down-sampling segment and an up-sampling segment of the Y component and is absent in down-sampling segments and up-sampling segments of the U component and the V component. Optionally, a convolutional layer of a second greatest scale in the down-sampling segments of the U component and the V component is preceded by a down-sampling unit but not by any convolutional layer. Optionally, a convolutional layer of a second greatest scale in the up-sampling segments of the U component and the V component is succeeded by an up-sampling unit but not by any convolutional layer.

In some embodiments, the computer-program product has computer-readable instructions for controlling one or more processors to convert outputs from the Y channel, the U channel, and the V channel into the output image in an RGB space In some embodiments, the computer-program product has computer-readable instructions for controlling one or more processors to pre-train the convolutional neural network. Optionally, the computer-program product has computer-readable instructions for controlling one or more processors to select a training style image; extract style features of the training style image using an analysis network; select a training content image from a collection of training images; exclude the training content image from the collection of training images; extract content features of the training content image using the analysis network; process the training content image through the at least one channel of the convolutional neural network to generate a training output image including the content features of the training content image morphed with the style features of the training style image; extract content features and style features of the training output image using the analysis network; compute loss by comparing the content features of the training output image with the content features of the training content image and comparing the style features of the training output image with the style features of the training style image using a loss function; and tune the convolutional neural network based on the loss.

In some embodiments, the computer-program product has computer-readable instructions for controlling one or more processors to reiterate pre-training the convolutional neural network using a different training content image or using a different training style image.

Optionally, the loss includes a L1 loss, a content loss, and a style loss. Optionally, the L1 loss is calculated by $$L_{L1} = \frac{W}{B+\varepsilon},$$

wherein $\varepsilon$ is a positive number;

$$W = \frac{\Sigma|w|}{c_w},$$

W is an average of absolute values of all convolutional kernels, $C_w$ stands for a total number of all convolutional kernels, w is a value of each of the convolutional kernels; and $$B = \frac{\Sigma|b|}{c_b},$$

B is an average of absolute values of all biases, $C_b$ stands for a total number of all biases, b is a value of each of the biases In some embodiments, the computer-program product has computer-readable instructions for controlling one or more processors to extract style features of the training style image, extract content features of the training content image, and extract content features and style features of the training output image using an analysis network including a plurality of convolutional layers of different scales sequentially connected, and a plurality of down-sampling units respectively between adjacent convolutional layers of the plurality of convolutional layers of different scales, a respective down-sampling unit configured to convert an input into an output having a different scale.

Those of skill will appreciate that the various illustrative neural networks, segments, units, channels, modules, and other operations described in connection with the configurations disclosed herein may be implemented as electronic hardware, computer software, or combinations of both. Such neural networks, segments, units, channels, modules, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method using a convolutional neural network, comprising processing an input image through at least one channel of the convolutional neural network to generate an output image comprising content features of the input image morphed with style features of a reference style image, wherein the at least one channel comprises a down-sampling segment, a densely connected segment, and an up-sampling segment sequentially connected together;

wherein processing the input image through the at least one channel of the convolutional neural network comprises:

processing an input signal through the down-sampling segment to generate a down-sampling segment output;

processing the down-sampling segment output through the densely connected segment to generate a densely connected segment output; and processing the densely connected segment output through the up-sampling segment to generate an up-sampling segment output;

wherein the input signal comprises a component of the input image;

wherein processing the down-sampling segment output through the densely connected segment comprises processing the down-sampling segment output through at least one densely connected convolutional network module;

a respective densely connected convolutional network module in the densely connected segment comprises a plurality of convolutional blocks sequentially connected, a respective one of the plurality of convolutional blocks comprising at least one convolutional layer;

outputs respectively from any and all previous convolutional blocks of the plurality of convolutional blocks in the respective densely connected convolutional network module are individually concatenated into an intermediate convolutional block or a last convolutional block of the plurality of convolutional blocks; and outputs respectively from the plurality of convolutional blocks in the respective densely connected convolutional network module are individually concatenated into an output from the respective densely connected convolutional network module, wherein the down-sampling segment further comprises at least one first cross- scale concatenation, a plurality of down-sampling units, and a plurality of first convolutional layers;

wherein processing the input signal through the down-sampling segment further comprises:

processing the input signal through the plurality of down-sampling units and the plurality of first convolutional layers;

outputting an output from an upstream down-sampling unit of the plurality of down-sampling units to an upstream convolutional layer of the plurality of first convolutional layers, and to a respective first cross-scale concatenation without being first processed by the upstream convolutional layer;

further down-sampling the output from the upstream down-sampling unit by the respective first cross-scale concatenation;

separately inputting a down-sampling output from the respective first cross-scale concatenation and a down-sampling output from a last down-sampling unit of the plurality of down-sampling units to a last convolutional layer of the plurality of first convolutional layers; and inputting an output from the last convolutional layer of the plurality of first convolutional layers into a first densely connected convolutional network module in the densely connected segment;

wherein the last convolutional layer and the upstream convolutional layer of the plurality of first convolutional layers are of different scales.

2. The computer-implemented method of claim 1, wherein processing the input signal through the down-sampling segment comprises processing the input signal through at least one down-sampling unit and at least one convolutional layer in the down-sampling segment;

down-sampling units and convolutional layers in the down-sampling segment are alternately arranged; and a respective down-sampling unit is configured to convert an input into an output having a different scale.

3. The computer-implemented method of claim 1, wherein processing the densely connected segment output through the up-sampling segment comprises processing the densely connected segment output through at least one up-sampling unit and at least one convolutional layer in the up-sampling segment;

up-sampling units and convolutional layers in the up-sampling segment are alternately arranged;

a respective up-sampling unit is configured to convert an input into an output having a different scale;

a total number of down-sampling units in the down-sampling segment is the same as a total number of up-sampling units in the up-sampling segment in a same channel; and the down-sampling units in the down-sampling segment respectively correspond to the up-sampling units in the up-sampling segment in the same channel.

4. The computer-implemented method of claim 3, wherein the input to the respective one of the plurality of convolutional blocks in the respective densely connected convolutional network module further comprises, in addition to the outputs respectively from the any and all previous convolutional blocks of the plurality of convolutional blocks in the respective densely connected convolutional network module, an input to the respective densely connected convolutional network module without being first processed by the any and all previous convolutional blocks of the plurality of convolutional blocks in the respective densely connected convolutional network module.

5. The computer-implemented method of claim 3, further comprising:

inputting outputs from the convolutional layers in the down-sampling units to the convolutional layers in the up-sampling units by at least one cross-segmental concatenation;

wherein an output from a respective convolutional layer in the down-sampling units is inputted to a respective convolutional layer of a same scale in the up-sampling units.

6. The computer-implemented method of claim 1, wherein the respective one of the plurality of convolutional blocks comprises a first convolutional layer comprising a 1*1 convolutional kernel and a second convolutional layer comprising a 3*3 convolutional kernel.

7. The computer-implemented method of claim 1, wherein down-sampling the output from one of the down-sampling units by the at least one first cross-scale concatenation in the down-sampling segment is a D-Bicubic sampling.

8. The computer-implemented method of claim 1, wherein the up-sampling segment further comprises at least one second cross-scale concatenation, a plurality of up-sampling units, and a plurality of second convolutional layers;

wherein processing the input signal through the up-sampling segment further comprises:

processing the input signal through the plurality of up-sampling units and the plurality of second convolutional layers;

outputting an output from an upstream up-sampling unit of the plurality of up-sampling units to a respective second cross-scale concatenation, and to an upstream convolutional layer of the plurality of second convolutional layers without being first processed by the respective second cross-scale concatenation;

further up-sampling the output from the upstream up-sampling unit by the respective second cross-scale concatenation; and inputting an up-sampling output from the respective second cross-scale concatenation to a downstream convolutional layer of the convolutional layers in the up-sampling segment;

separately inputting an up-sampling output from the respective second cross-scale concatenation and an up-sampling output from a last up-sampling unit of the plurality of up-sampling units to a last convolutional layer of the plurality of second convolutional layers;

wherein the last downstream convolutional layer and the upstream convolutional layer of the plurality of second convolutional layers are of different scales.

9. The computer-implemented method of claim 8, wherein up-sampling the output from one of the up-sampling units by the at least one second cross-scale concatenation in the up-sampling segment is a U-Bicubic sampling.

10. The computer-implemented method of claim 1, wherein processing the input image through at least one channel of the convolutional neural network comprises:

processing a Y component of the input image through a Y channel of the convolutional neural network;

processing a U component of the input image through a U channel of the convolutional neural network; and processing a V component of the input image through a V channel of the convolutional neural network;

wherein the Y component, the U component, and the V component are components of the input image in a YUV space.

11. The computer-implemented method of claim 10, wherein the YUV space is a YUV420 space or a YUV422 space.

12. The computer-implemented method of claim 10, wherein down-sampling segments and up-sampling segments of the Y component, the U component, and the V component comprise convolutional layers of a plurality of different scales, a convolutional layer of a greatest scale is present in a down-sampling segment and an up-sampling segment of the Y component and is absent in down-sampling segments and up-sampling segments of the U component and the V component;

a convolutional layer of a second greatest scale in the down-sampling segments of the U component and the V component is preceded by a down-sampling unit but not by any convolutional layer; and a convolutional layer of a second greatest scale in the up-sampling segments of the U component and the V component is succeeded by an up-sampling unit but not by any convolutional layer.

13. The computer-implemented method of claim 10, further comprising converting outputs from the Y channel, the U channel, and the V channel into the output image in an RGB space.

14. The computer-implemented method of claim 1, further comprising pre-training the convolutional neural network by selecting a training style image;
extracting style features of the training style image;
selecting a training content image from a collection of training images;
excluding the training content image from the collection of training images;
extracting content features of the training content image;
processing the training content image through the at least one channel of the convolutional neural network to generate a training output image comprising the content features of the training content image morphed with the style features of the training style image;
extracting content features and style features of the training output image;
computing loss by comparing the content features of the training output image with the content features of the training content image and comparing the style features of the training output image with the style features of the training style image using a loss function; and
tuning the convolutional neural network based on the loss.

15. The computer-implemented method of claim 14, further comprising reiterating pre-training the convolutional neural network using a different training content image or a different training style image.

16. The computer-implemented method of claim 14, wherein the loss comprises a L1 loss, a content loss, and a style loss;

the L1 loss is calculated by $$L_{L1} = \frac{W}{B+\varepsilon};$$

wherein $\varepsilon$ is a positive number;

$$W = \frac{\Sigma|w|}{C_w},$$

W is an average of absolute values of all convolutional kernels, $C_w$ stands for a total number of all convolutional kernels, w is a value of each of the convolutional kernels; and $$B = \frac{\Sigma|b|}{C_b},$$

B is an average of absolute values of all biases, $C_b$ stands for a total number of all biases, b is a value of each of the biases.

17. The computer-implemented method of claim 14, wherein extracting style features of the training style image, extracting content features of the training content image, and extracting content features and style features of the training output image are performed using an analysis network comprising a plurality of convolutional layers of different scales sequentially connected, and a plurality of down-sampling units respectively between adjacent convolutional layers of the plurality of convolutional layers of different scales, a respective down-sampling unit configured to convert an input into an output having a different scale.

18. An apparatus for generating a composite image, comprising:

a memory;
one or more processors;
wherein the memory and the one or more processors are connected with each other; and
the memory stores computer-executable instructions for controlling the one or more processors to process an input image through at least one channel of a convolutional neural network to generate an output image comprising content features of the input image morphed with style features of a reference style image, wherein the at least one channel comprises a down-sampling segment, a densely connected segment, and an up-sampling segment sequentially connected together;
wherein the memory stores computer-executable instructions for controlling the one or more processors to:
process an input signal through the down-sampling segment to generate a down- sampling segment output;
process the down-sampling segment output through the densely connected segment to generate a densely connected segment output; and
process the densely connected segment output through the up-sampling segment to generate an up-sampling segment output;
wherein processing the down-sampling segment output through the densely connected segment comprises processing the down-sampling segment output through at least one densely connected convolutional network module;
a respective densely connected convolutional network module in the densely connected segment comprises a plurality of convolutional blocks sequentially connected, a respective one of the plurality of convolutional blocks comprising at least one convolutional layer;
outputs respectively from any and all previous convolutional blocks of the plurality of convolutional blocks in the respective densely connected convolutional network module are individually concatenated into an intermediate convolutional block of the plurality of convolutional blocks; and
outputs respectively from the plurality of convolutional blocks in the respective densely connected convolutional network module are individually concatenated into an output from the respective densely connected convolutional network module;
wherein the down-sampling segment further comprises at least one first cross- scale concatenation, a plurality of down-sampling units, and a plurality of first convolutional layers;
wherein the memory further stores computer-executable instructions for controlling the one or more processors to:

process the input signal through the plurality of down-sampling units and the plurality of first convolutional layers;

output an output from an upstream down-sampling unit of the plurality of down- sampling units to an upstream convolutional layer of the plurality of first convolutional layers, and to a respective first cross-scale concatenation without being first processed by the upstream convolutional layer;

further down-sample the output from the upstream down-sampling unit by the respective first cross-scale concatenation;

separately input a down-sampling output from the respective first cross-scale concatenation and a down-sampling output from a last down-sampling unit of the plurality of down-sampling units to a last convolutional layer of the plurality of first convolutional layers; and input an output from the last convolutional layer of the plurality of first convolutional layers into a first densely connected convolutional network module in the densely connected segment;

wherein the last convolutional layer and the upstream convolutional layer of the plurality of first convolutional layers are of different scales.

19. A computer-program product comprising a non-transitory tangible computer-readable medium having computer-readable instructions thereon, the computer-readable instructions being executable by a processor to cause the processor to perform processing an input image through at least one channel of a convolutional neural network to generate an output image comprising content features of the input image morphed with style features of a reference style image, wherein the at least one channel comprises a down-sampling segment, a densely connected segment, and an up-sampling segment sequentially connected together;

wherein processing the input image through the at least one channel of the convolutional neural network comprises:

processing an input signal through the down-sampling segment to generate a down-sampling segment output;

processing the down-sampling segment output through the densely connected segment to generate a densely connected segment output; and processing the densely connected segment output through the up-sampling segment to generate an up-sampling segment output;

wherein processing the down-sampling segment output through the densely connected segment comprises processing the down-sampling segment output through at least one densely connected convolutional network module;

a respective densely connected convolutional network module in the densely connected segment comprises a plurality of convolutional blocks sequentially connected, a respective one of the plurality of convolutional blocks comprising at least one convolutional layer;

outputs respectively from any and all previous convolutional blocks of the plurality of convolutional blocks in the respective densely connected convolutional network module are individually concatenated into an intermediate convolutional block of the plurality of convolutional blocks; and outputs respectively from the plurality of convolutional blocks in the respective densely connected convolutional network module are individually concatenated into an output from the respective densely connected convolutional network module;

wherein the down-sampling segment further comprises at least one first cross-scale concatenation, a plurality of down-sampling units, and a plurality of first convolutional layers;

wherein processing the input signal through the down-sampling segment further comprises:

processing the input signal through the plurality of down-sampling units and the plurality of first convolutional layers;

outputting an output from an upstream down-sampling unit of the plurality of down-sampling units to an upstream convolutional layer of the plurality of first convolutional layers, and to a respective first cross-scale concatenation without being first processed by the upstream convolutional layer;

further down-sampling the output from the upstream down-sampling unit by the respective first cross-scale concatenation;

separately inputting a down-sampling output from the respective first cross-scale concatenation and a down-sampling output from a last down-sampling unit of the plurality of down-sampling units to a last convolutional layer of the plurality of first convolutional layers; and inputting an output from the last convolutional layer of the plurality of first convolutional layers into a first densely connected convolutional network module in the densely connected segment;

wherein the last convolutional layer and the upstream convolutional layer of the plurality of first convolutional layers are of different scales.

\* \* \* \* \*